United States Patent [19]

Terazawa et al.

[11] Patent Number: 5,540,488

[45] Date of Patent: Jul. 30, 1996

[54] HYDRAULIC BRAKING SYSTEM HAVING AN AUXILIARY PRESSURE SOURCE

[75] Inventors: Tadashi Terazawa; Michiharu Nishii, both of Toyota, Japan

[73] Assignee: Aisin Seiki Kabushiki Kaisha, Kariya, Japan

[21] Appl. No.: 502,778

[22] Filed: Jul. 14, 1995

[30] Foreign Application Priority Data

May 11, 1995 [JP] Japan ..................... 7-138438
May 11, 1995 [JP] Japan ..................... 7-138824

[51] Int. Cl.⁶ ........................................... B60T 8/32
[52] U.S. Cl. ..................... 303/116.1; 303/119.1; 303/113.2; 303/10
[58] Field of Search .................. 303/116.1, 116.2, 303/119.1, 116.4, 113.1, 113.2, 901, 115.1, 115.5, 115.4, 10–12, 68–69, 114.1, 114.2, 116.3, 186, 187, 188, 189, 190

[56] References Cited

U.S. PATENT DOCUMENTS

| | | | |
|---|---|---|---|
| 3,514,162 | 5/1970 | Erlebach et al. | 303/116.2 |
| 3,639,009 | 2/1972 | Klein et al. | 303/10 |
| 3,922,021 | 11/1975 | Every | 303/115.4 |
| 4,125,234 | 11/1978 | Tregre | 303/10 |
| 4,181,371 | 1/1980 | Adachi | 303/10 |
| 4,354,715 | 10/1982 | Farr et al. | 303/10 |
| 4,636,009 | 1/1987 | Tsuru et al. | 303/93 |
| 5,215,359 | 6/1993 | Burgdorf et al. | 303/116.2 |
| 5,472,266 | 12/1995 | Volz et al. | 303/116.1 |

FOREIGN PATENT DOCUMENTS 3-169769  7/1991  Japan .
5-507667  11/1993  Japan .

*Primary Examiner*—Douglas C. Butler
*Attorney, Agent, or Firm*—Burns, Doane, Swecker & Mathis

[57] ABSTRACT

The present invention is directed to a hydraulic braking system having a hydraulic braking pressure circuit for braking each wheel of an automotive vehicle with brake fluid fed to a wheel cylinder operatively mounted on the wheel. The system includes an auxiliary pressure source which has an inlet for introducing the brake fluid and an outlet connected to the pressure circuit for discharging thereinto the pressurized brake fluid. A circulation passage is disposed between the outlet and the inlet for communicating with each other. An auxiliary valve is disposed in the circulation passage so as to open or close the passage. An auxiliary reservoir is connected to the circulation passage between the valve and the inlet of the source. The auxiliary reservoir has a capacity for storing a predetermined amount of brake fluid. And, a controller is provided for driving the source and actuating the valve so as to open or close the circulation passage. Accordingly, the brake fluid discharged from the pressure source is fed into the pressure circuit when the valve closes the passage, while the brake fluid discharged from the pressure source is circulated in the circulation passage via the valve when the valve opens the passage.

30 Claims, 26 Drawing Sheets

HYDRAULIC BRAKING SYSTEM HAVING AN AUXILIARY PRESSURE SOURCE

BACKGROUND OF THE INVENTION

1. Field of the Invention

The present invention relates to a hydraulic braking system for providing various braking force control modes in an automotive vehicle, and more particularly to a hydraulic braking system which has an auxiliary pressure source separate from a master cylinder or the like, and which is capable of controlling the braking force applied to each wheel individually.

2. Description of the Prior Art

Recently, an automotive vehicle is provided with a braking force control system for providing various control modes such as an anti-skid control mode, traction control mode, vehicle stability control mode and the like. The provision of those modes results in increase in cost, and decrease in space. Therefore, various systems have been proposed to provide a hydraulic braking system employed in the braking force control system at a relatively low cost, with a relatively small space occupied by the system, comparing with the prior systems. With respect to those systems, it has been proposed to employ inexpensive electromagnetic valves for a pressure control device and reduce the number of electromagnetic valves as small as possible.

In Japanese Patent Laid-open Publication No. 3-169769, for example, inexpensive valves are employed in an antiskid control system, wherein hydraulic circuits communicating a master cylinder with wheel cylinders operatively mounted on road wheels of a vehicle are divided into two circuits so as to provide a diagonal dual circuits system. In each hydraulic braking pressure circuit, an inlet valve is disposed, while an outlet valve is disposed in each return circuit or passage. These inlet and outlet valves are controlled to be opened or closed, respectively, in response to each wheel speed. According to that system, in a pressure circuit which connects a pressure circuit which is provided between the outlet port of each inlet valve and a wheel cylinder for each front wheel, with a pressure circuit which is provided between the inlet port of each outlet valve and a wheel cylinder for each rear wheel, an open/close valve which is placed in the open position in its inoperative condition is disposed in each pressure circuit, and also a control circuit is provided for controlling the operation of each open/close valve individually so as to be capable of controlling the braking pressure individually in each of the wheel cylinders of the front and rear wheels which are paired with each other through the pressure circuit.

In FIG. 2 of the above-described publication, an apparatus having an auxiliary pressure source for returning the brake fluid has been disclosed, as shown in FIG. 25. A pair of auxiliary reservoirs 25, 26 are incorporated into the auxiliary pressure source 10a, and connected with return circuits 18a, 18b which communicate the outlet ports of outlet valves 21p, 22p ("p" is added after the numerals used in the publication to avoid confusing with the numerals used in the embodiments of the present invention), respectively. This arrangement has been explained in the publication as an example applied to a system for releasing the hydraulic pressure in the wheel cylinder under the condition of non-atmospheric pressure.

In Japanese Patent Laid-open (for PCT) Publication No. 5-507667, there is disclosed an apparatus for controlling the braking pressure in each wheel cylinder. An anti-lock oil pressure braking system disclosed in this publication has a separating valve for blocking a brake passage, a return passage for connecting a wheel brake with the inlet side of a pump, an outlet valve disposed in the return passage, and a pressure passage for connecting the pressurized side of the pump to a position between the separating valve and the wheel brake. In that publication, U.S. Pat. No. 4,636,009 has been employed as a prior art, and it is described that in view of the prior art having three-port three-position valves with complex structure, a method for providing a single electromagnetic control outlet valve for closing or opening the return passage, disposing a control valve in the brake passage, and supplying from the pump the pressurized fluid into the wheel brakes through a diaphragm, has been proposed. Furthermore, in that publication, a limiting element (9) has been disposed in the pressure passage (8), to provide means for introducing additional pressurized fluid into a control circuit downstream of the separating valve.

However, according to the apparatus disclosed in the Publication No. 3-169769, the braking force of each wheel may be controlled independently in such a limited sense that the braking pressure in the front wheel cylinder can not be held constant, when the braking pressure in the rear wheel cylinder is increased, and that the braking pressure in the rear wheel cylinder can not be held constant, when the braking pressure in the front wheel cylinder is decreased. That is, the selection timing of the so-called hold mode is limited. For example, when the rear wheel RR or RL does not tend to be locked, nor has been locked, the braking pressure in the rear wheel RR or RL must be increased according to the apparatus disclosed in the publication, so that the open/close valves 23p, 24p are opened. As a result, the braking pressure control for the rear wheels is dependent upon that for the front wheels, so that the property sufficient for the independent braking force control can not be obtained. The braking pressure at the one wheel's side (rear wheel's side) is affected by the pressure at another wheel's side (front wheel's side) in the same hydraulic circuit, so that the apparatus can be used only for the diagonal dual circuits system, but it can not be used for a front and rear dual circuits system.

Furthermore, according to the apparatus disclosed in the Publication No. 3-169769, the brake fluid discharged from the auxiliary pressure source 10a is supplied to a passage filled with a fluid pressurized at high pressure, so that the load caused against the auxiliary pressure source 10a is high. Therefore, the pressure source 10a may cause a large noise, and its durability will be shortened. While the braking pressure is being controlled by the inlet valve 20p, the outlet valve 22p and the open/close valve 24p, the variation of the braking pressure is directly transmitted to the pressure generator 1p. This results in a so-called kick-back phenomenon thereby to discomfort a vehicle driver depressing a brake pedal.

In order to prevent the kick-back phenomenon and reduce the noise caused by the above-described valve operation, it is effective to provide a closed circuit including the wheel cylinders, in the hydraulic braking pressure circuit, and control the braking pressure within the closed circuit. In the apparatus as shown in FIG. 2 of the Publication No. 3-169769, therefore, it is necessary to arrange the apparatus as shown in FIG. 26, with the electromagnetic valves 27p, 28p added, and make the inlet valve 20p function as a cut-off valve for blocking the communication with the pressure generator 1p. The number of electromagnetic valves is relatively small in comparing with the prior apparatus. Even if the apparatus is constituted as described above, however, the selection of the hold mode is limited.

Furthermore, in the case where the braking pressure has to be controlled without depressing the brake pedal, such as in the traction control mode or vehicle stability control mode, a hydraulic pressure source is needed in addition to the master cylinder or the like. When a conventional auxiliary pressure source is disposed in the circuit, however, it will become necessary to provide further a pre-charging pump or the like for ensuring a necessary increasing rate of pressure at the time of starting the pressure control. This will also result in increase in cost. It is, therefore, effective to maintain the auxiliary pressure source driven at relatively low load.

According to the apparatus disclosed in the Publication No. 5-507667, the separating valve (4) and the outlet valve (6) must be provided for each wheel to be controlled, so that the number of electromagnetic valves can not be reduced. One of the inventors in the present application has proposed in the separate U.S. patent application, an apparatus as disclosed in FIG. 27 to decrease and re-increase the braking pressure in each wheel cylinder in one pressure circuit system, and decrease its cost. That is, in the one pressure circuit system, only a single three-port two-position electromagnetic valve (electromagnetic changeover valve) and a pair of two-port two-position electromagnetic valve (normally open electromagnetic shut off valve) are included, and the brake fluid is supplied by a fluid pump to a position between the latter valve and each wheel cylinder through an orifice and a check valve, respectively. However, in this apparatus, the three-port two-position electromagnetic valves 14a, 34a are necessitated, and the hold mode in each wheel cylinder is provided for limiting the braking pressure within a certain pressure variation with the two-port two-position electromagnetic valve opened or closed, without shutting off the braking pressure. Therefore, in the case where it is necessary to block the pressure passage completely in the hold mode, the apparatus as shown in FIG. 27 is not appropriate. It is preferable that the two-port two-position electromagnetic valve is employed, and the number of valves is as small as possible, because the more the number of ports and positions of the valve is, the higher the cost of the electromagnetic valve is. Sometimes, a pressure sensor which is expensive is disposed in the vehicle stability control system, but the provision of the pressure sensor results in increase in cost. It is, therefore, preferable that the number of such expensive sensors is as small as possible. Thus, although the wheel speed sensor for detecting the wheel speed is necessary, it is preferable to provide a desired function without employing the pressure sensor or the like.

SUMMARY OF THE INVENTION

Accordingly, it is an object of the present invention to provide a hydraulic braking system for an automotive vehicle with a closed circuit provided in a hydraulic braking pressure circuit, and having an auxiliary pressure source for discharging a pressurized brake fluid into the close circuit.

It is another object of the present invention to provide a hydraulic braking system having an auxiliary pressure source for an automotive vehicle, which employs relatively inexpensive valves, minimizes the number of valves, and provides pressure control modes including a hold mode to shut off a fluid passage communicated with each wheel cylinder.

It is a further object of the present invention to provide the hydraulic braking system as described above which effectively prevents a kick-back phenomenon.

Yet, it is an object of the present invention to provide a hydraulic braking system which further provides a vehicle stability control mode, and which enables a vehicle driver to depress a brake pedal to brake a wheel during the pressure control operation, without a pressure sensor or the like disposed in the system.

In accomplishing the above and other objects, according to the present invention, a hydraulic braking system having a hydraulic braking pressure circuit for braking each wheel of an automotive vehicle with brake fluid fed to a wheel cylinder operatively mounted on the wheel, is arranged to include an auxiliary pressure source which has an inlet for introducing the brake fluid and an outlet connected to the hydraulic braking pressure circuit for discharging thereinto the pressurized brake fluid. A circulation passage is disposed between the outlet of the auxiliary pressure source and the inlet thereof for communicating each other. An auxiliary valve is disposed in the circulation passage so as to open or close the circulation passage. An auxiliary reservoir is connected to the circulation passage between the auxiliary valve and the inlet of the auxiliary pressure source. The auxiliary reservoir has a capacity for storing a predetermined amount of brake fluid. And, a controller is provided for driving the auxiliary pressure source and actuating the auxiliary valve so as to open or close the circulation passage. Accordingly, the brake fluid discharged from the auxiliary pressure source is fed into the hydraulic braking pressure circuit when the auxiliary valve closes the circulation passage, while the brake fluid discharged from the auxiliary pressure source is circulated in the circulation passage via the auxiliary valve when the auxiliary valve opens the circulation passage.

Preferably, the auxiliary pressure source comprises an electric motor and a fluid pump which is driven by the electric motor to introduce the brake fluid from the auxiliary reservoir into the fluid pump through its inlet and discharge the pressurized brake fluid from its outlet. The auxiliary valve may be of a normally closed two-port two-position electromagnetic valve.

The hydraulic braking pressure circuit may comprise a plurality of wheel cylinders which are operatively mounted on the wheels of the automotive vehicle, respectively, a reservoir for storing the brake fluid, and a master cylinder which introduces the brake fluid from the reservoir and generates a master cylinder pressure in response to a depression of a brake pedal. The system may further include a first valve which is disposed between the master cylinder and at least one wheel cylinder of the wheel cylinders so as to open or close the communication therebetween. The first valve is arranged to provide at its downstream a closed circuit between the wheel cylinder and the first valve. And, the system may include a discharge passage which connects the outlet of the auxiliary pressure source to the closed circuit, and a second valve which is disposed in the discharge passage so as to open or close the discharge passage.

In the above-described system, the first valve may be of a normally open two-port two-position electromagnetic valve, and the second valve may be of a normally closed two-port two-position electromagnetic valve.

In the hydraulic braking system as described above, the hydraulic braking pressure circuit is preferably divided into two circuits, each of which has the first valve, and at least one of which has the second valve, and in which a pair of auxiliary pressure sources are connected to the two circuits through the discharge passage, respectively, and both of the auxiliary pressure sources are arranged to be driven by a single driving source.

The hydraulic braking pressure circuit may include a plurality of wheel cylinders which are operatively mounted on the wheels of the automotive vehicle, respectively, the reservoir, and the master cylinder, and further include a first valve which is disposed between the master cylinder and at least first and second wheel cylinders so as to open or close the communication therebetween, and a pair of second valves which are disposed between the first valve and the first and second wheel cylinders so as to open or close the communication between the first valve and the first wheel cylinder, and the communication between the first valve and the second wheel cylinder, respectively. In this system, the auxiliary pressure source is connected at its outlet to a position between the first valve and the second valve, and the auxiliary valve is disposed in the circulation passage.

In the system as described above, the first valve may be of a normally open two-port two-position electromagnetic valve, the second valves may be of normally open two-port two-position electromagnetic valves which are disposed between the first valve and the first wheel cylinder, and between the first valve and the second wheel cylinder, respectively, and the auxiliary valve may be of a normally closed two-port two-position electromagnetic valve. It is preferable in this system that a first check valve and a second check valve are disposed between the master cylinder and the first and second wheel cylinders, respectively, so that the first and second check valves permit the brake fluid to flow in the direction toward the master cylinder and prevent the brake fluid from flowing in the reverse direction.

Or, the hydraulic braking system may include a first valve which is disposed between the master cylinder and at least first and second wheel cylinders so as to open or close the communication therebetween, and a pair of third valves which are disposed between the outlet of the auxiliary pressure source and the first and second wheel cylinders so as to open or close the communication between the auxiliary pressure source and the first wheel cylinder, and the communication between the auxiliary pressure source and the second wheel cylinder, respectively.

In the system as described above, the first valve may be of a normally open two-port two-position electromagnetic valve, and the third valve may be of a pair of normally closed two-port two-position electromagnetic valves disposed between the auxiliary pressure source and the first wheel cylinder, and between the auxiliary pressure source and the second wheel cylinder, respectively, while the auxiliary valve may be of a normally closed two-port two-position electromagnetic valve. Preferably, a first check valve and a second check valve are disposed between the master cylinder and the first and second wheel cylinders, respectively, so that the first and second check valves permit the brake fluid to flow in the direction toward the master cylinder and prevent the brake fluid from flowing in the reverse direction. A third check valve and a fourth check valve are disposed between the first valve and the first and second wheel cylinders, respectively, so that the third and fourth check valves permit the brake fluid to flow in the direction toward the first and second wheel cylinders and prevent the brake fluid from flowing in the reverse direction.

In the above-described hydraulic braking systems, a changeover valve may be disposed between the master cylinder and the first and second check valves so as to be selectively placed in one of a first position where the first and second check valves are communicated with the master cylinder, and where the communication between the master cylinder and the inlet side of the auxiliary pressure source is blocked, and a second position where the communication between the first and second check valves and the master cylinder is blocked, and where the inlet side of the auxiliary pressure source is communicated with the master cylinder.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
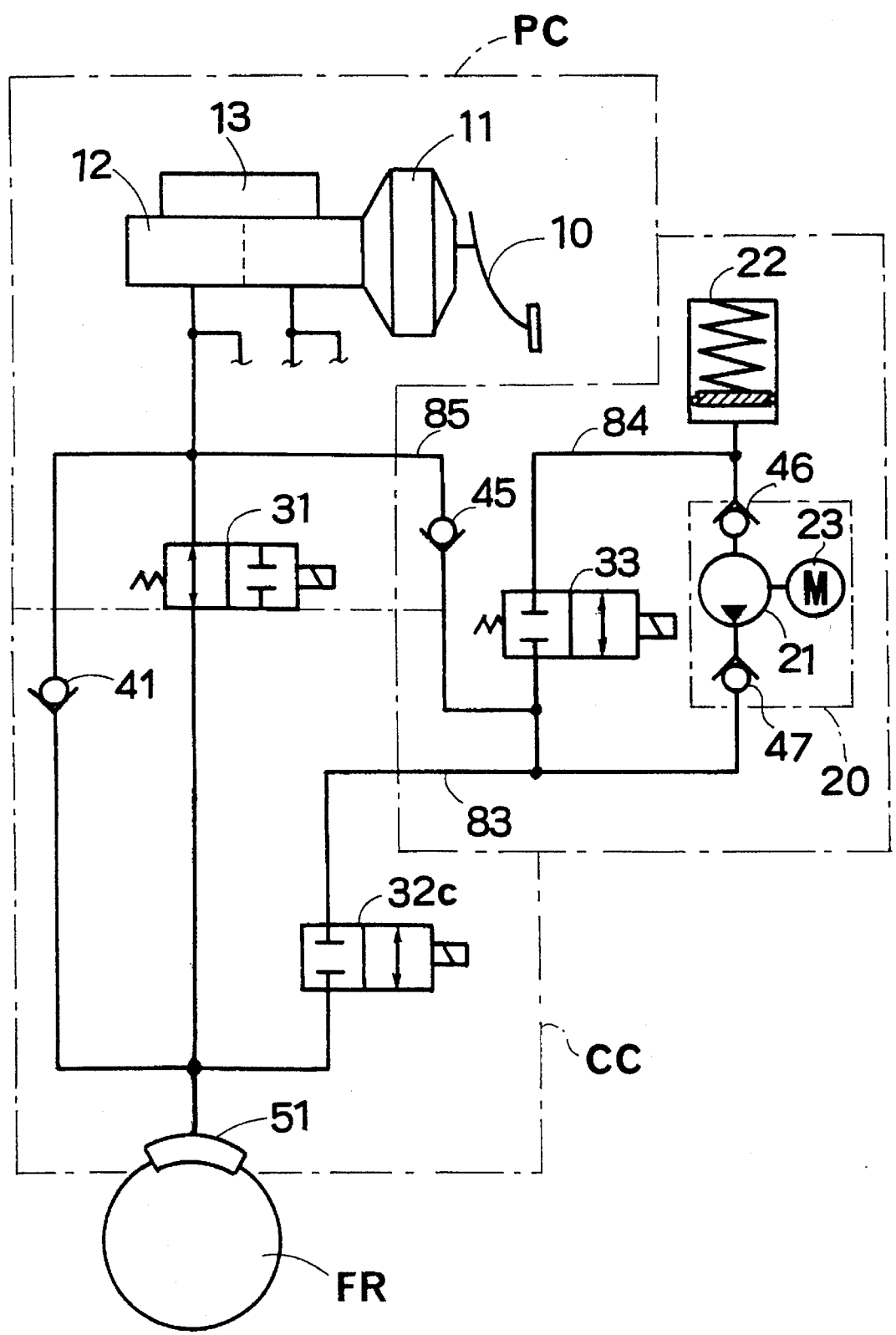
FIG. 1 is a schematic block diagram illustrating a first basic system for a hydraulic braking system according to the present invention.
Figure 2:
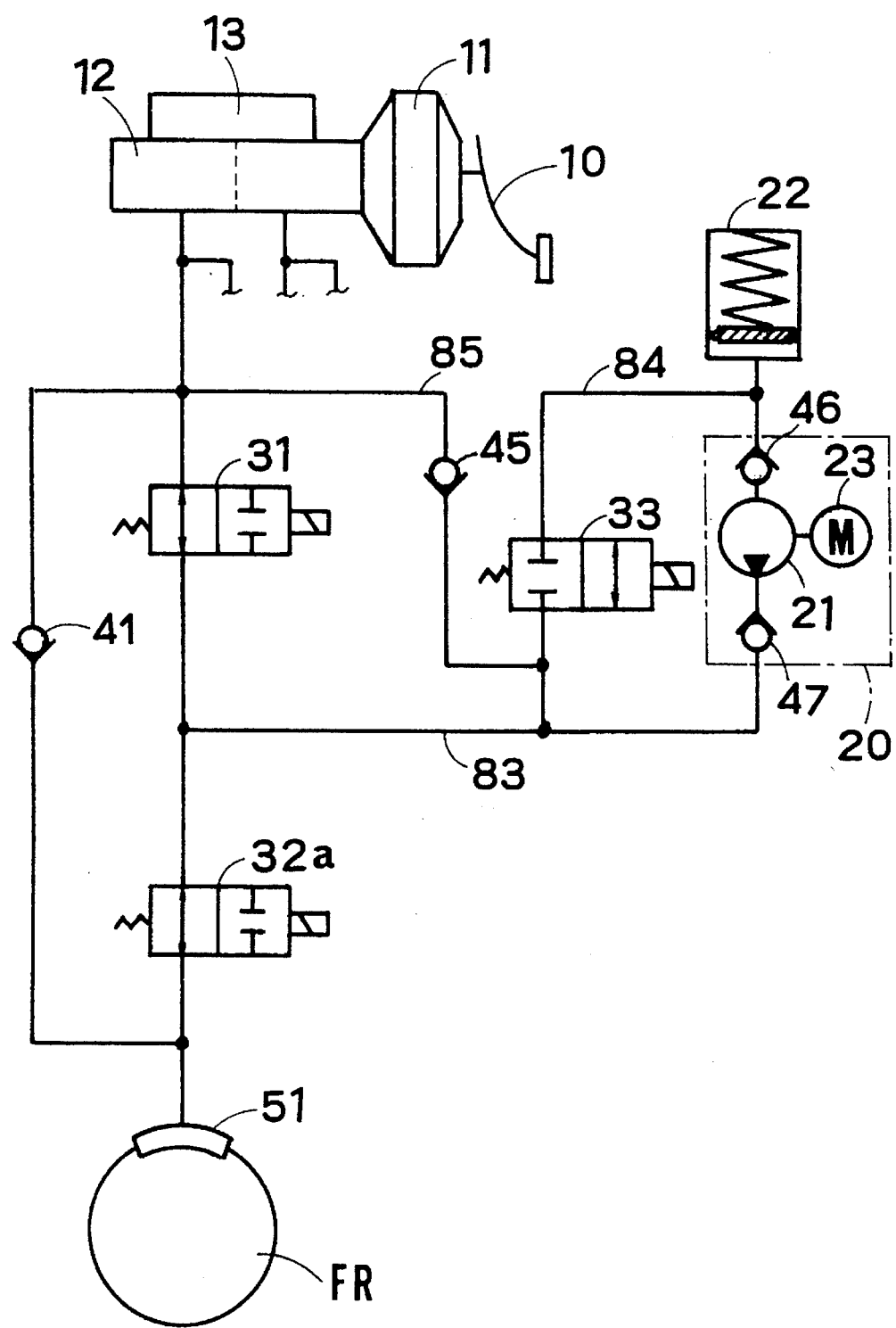
FIG. 2 is a schematic block diagram of a second basic system for a hydraulic braking system according to the present invention.

Referring to FIGS. 1–8, there are schematically illustrated basic systems for use in a hydraulic braking system according to the present invention, wherein FIGS. 1 and 2 relate to the first and second basic systems, respectively, and illustrate one of four hydraulic circuits connected to four wheel cylinders, and wherein FIGS. 3–8 illustrate two of the hydraulic circuits in the third to eighth basic systems, respectively. These basic systems are incorporated into the first to thirteenth embodiments as shown in FIGS. 10–22, each of which is incorporated into a hydraulic braking system as shown in FIG. 9.

In the first basic system as shown in FIG. 1, a closed circuit CC is formed in a hydraulic braking pressure circuit PC. The first system includes an auxiliary pressure source 20 which discharges a pressurized brake fluid. In a circulation passage 84 which connects the outlet side of the auxiliary pressure source 20 with the inlet side thereof, a valve 33 is provided for closing or opening the circulation passage 84, as the auxiliary valve according to the present invention, and an auxiliary reservoir 22 is disposed in the circulation passage 84 between the valve 33 and the inlet side of the auxiliary pressure source 20 and adapted to store a predetermined amount of brake fluid. It is so arranged that the auxiliary pressure source 20 is driven continuously, and the pressurized brake fluid is discharged from the auxiliary pressure source 20 when the circulation passage 84 is shut off by the valve 33, whereas the brake fluid discharged from the auxiliary pressure source 20 is circulated when the circulation passage 84 is opened by the valve 33. The auxiliary pressure source 20 may include a fluid pump 21 which is driven by an electric motor 23 to pressurize the brake fluid introduced from the auxiliary reservoir 22 and discharge the same. A pair of check valves 46, 47 are provided at the inlet side and the outlet side of the fluid pump 21, respectively so as to limit the flow of the brake fluid in a direction of a predetermined circulation. The hydraulic braking pressure circuit PC includes a wheel cylinder 51 which applys a braking force to a wheel FR, for example, and a master cylinder 12 which pressurizes the brake fluid in a reservoir 13 to generate a master cylinder pressure. The master cylinder 12 is actuated by a booster 11 which is operated in response to a depression of a brake pedal 10 to boost the master cylinder 12.

The first basic system further includes a valve 31 as the first valve according to the present invention, which opens or closes the communication between the master cylinder 12 and the wheel cylinder 51, a discharge passage 83 which connects the outlet side of the auxiliary pressure source 20 to a position between the valve 31 and the wheel cylinder 51, and a valve 32c which closes or opens the discharge passage 83. The closed circuit CC is, therefore, provided between the valve 31 and the wheel cylinder 51. A check valve 41 may be disposed in a passage between the master cylinder 12 and the wheel cylinder 51, so as to permit the brake fluid to flow in the direction toward the master cylinder 12 and prevent it from flowing in the reverse direction. A check valve 45 may also be disposed in a return passage 85 which connects the outlet side of the auxiliary pressure source 20 to a position between the master cylinder 12 and the valve 31. The check valve 45 is arranged to permit the brake fluid to flow in the direction toward the master cylinder 12 and restrains the reverse flow. Therefore, when the brake pedal 10 is released and the pressure in the master cylinder 12 becomes lower than the pressure of the brake fluid discharged from the auxiliary pressure source 20, the discharged brake fluid will be returned to the master cylinder 12 and the reservoir 13 through the check valve 45. A normally open two-port two-position electromagnetic valve is used for the valve 31 in this system, while a normally closed two-port two-position electromagnetic valve is used for the valve 32c and the valve 33 as shown in FIG. 1.

In operation, when the braking pressure control in the closed circuit CC is initiated, the auxiliary pressure source 20 is driven and the valve 33 is actuated to open the circulation passage 84. Consequently, the brake fluid in the auxiliary reservoir 22 is introduced into the auxiliary pressure source 20 to discharge therefrom a pressurized brake fluid into the auxiliary reservoir 22 through the circulation passage 84, whereby the auxiliary pressure source 20 is driven continuously with a relatively low load. When the pressure control for an anti-skid control mode is initiated, for example, the valve 31 is placed in its closed position to shut off the communication between the master cylinder 12 and the wheel cylinder 51. At the same time, the auxiliary pressure source 20 is started to discharge the pressurized fluid, and the valve 33 is placed in its open position. At this time, the valve 32c has been placed in its closed position, so that the pressure in the wheel cylinder 51 is held. Then, if a decrease mode is selected for the wheel FR, the valve 32c is placed in its open position to communicate the wheel cylinder 51 with the auxiliary reservoir 22 through the valve 32c and the valve 33, the brake fluid in the wheel cylinder 51 is discharged to the auxiliary reservoir 22 thereby to decrease the pressure in the wheel cylinder 51. During this operation, the brake fluid discharged from the auxiliary pressure source 20 is circulated through the valve 33 as described above, so that the operation for decreasing the pressure will not be affected by the auxiliary pressure source 20. When the valve 33 is placed in its closed position to shut off the circulation passage 84, the brake fluid in the auxiliary reservoir 22 is fed to the wheel cylinder 51 through the valve 32c which is placed in its open position to increase the pressure in the wheel cylinder 51.

The second basic system as shown in FIG. 2 is arranged to incorporate the auxiliary pressure source 20 into the hydraulic braking system as a part of it. That is, a valve 32a is disposed between the valve 31 and the wheel cylinder 51, instead of the valve 32c in FIG. 1, and the outlet side of the auxiliary pressure source 20 is connected to a position between the valve 31 and the valve 32a, both of which are normally open two-port two-position electromagnetic valves. In the normal braking operation of this system, therefore, when the brake pedal 10 is depressed, the brake fluid is discharged from the master cylinder 12 to apply the master cylinder pressure to the wheel cylinder 51 through the valve 31 and the valve 32a. When the pressure control for the anti-skid control mode is initiated, the valve 31 is placed in its closed position to shut off the communication between the master cylinder 12 and the wheel cylinder 51, and the valve 32a is placed in its closed position to hold the pressure in the wheel cylinder 51. At the same time, the auxiliary pressure source 20 is started to discharge the pressurized fluid, and the valve 33 is placed in the open position. Then, if the valve 32a is placed in its open position to communicate the wheel cylinder 51 with the auxiliary reservoir 22 through the valve 32a and the valve 33, the brake fluid in the wheel cylinder 51 is discharged to the auxiliary reservoir 22 thereby to decrease the pressure in the wheel cylinder 51. During this operation, the brake fluid discharged from the auxiliary pressure source 20 is circulated through the valve 33 placed in its open position and the auxiliary reservoir 22, so that the operation for decreasing the pressure will not be affected by the auxiliary reservoir 22. When the valve 33 is placed in its closed position to shut off the passage, the brake fluid in the auxiliary reservoir 22 is fed to the wheel cylinder 51 through the valve 32a which is placed in its open position to increase the pressure in the wheel cylinder 51. With the valve 32a held in its open position, the valve 33 is placed in its closed position, and then the valve 31 is placed in its open position, so that the system returns to the condition as shown in FIG. 1, where the pressure in the master cylinder 12 can be increased in response to a depression of the brake pedal 10.

Figure 3:
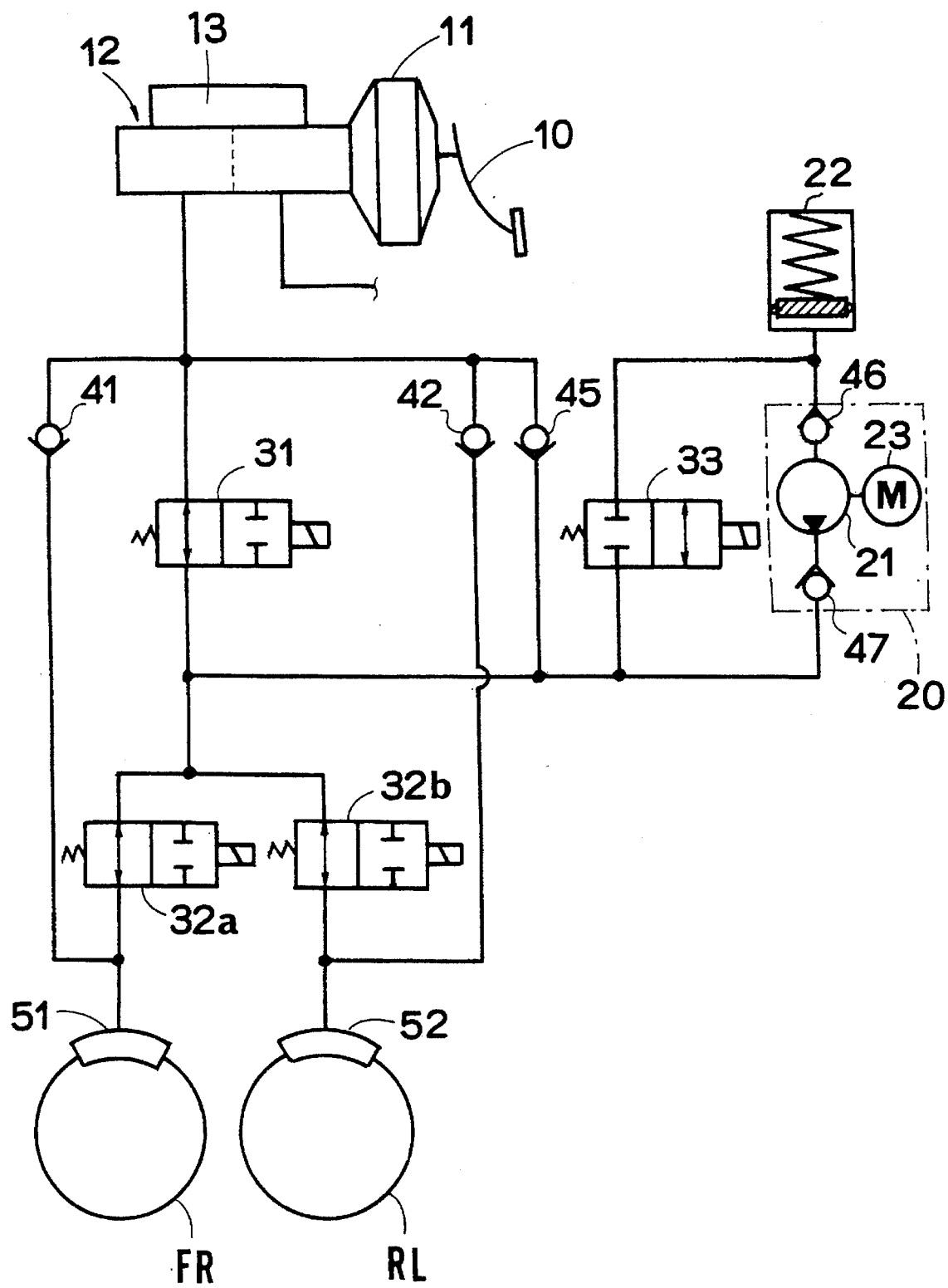
FIG. 3 is a schematic block diagram of a third basic system for a hydraulic braking system according to the present invention.

FIG. 3 illustrates the third basic system, in which a pair of wheel cylinders 51, 52 are operatively mounted on the wheels FR, RL, respectively, and the master cylinder 12 is provided for pressurizing the brake fluid in the reservoir 13 and generating the master cylinder pressure. The third basic system further includes the valve 31 as the first valve according to the present invention, which opens or closes the communication between the master cylinder 12 and at least the wheel cylinders 51, 52, and a pair of valves 32a, 32b as the second valves according to the present invention, which open or close the communication between the valve 31 and the wheel cylinders 51, 52. The auxiliary pressure source 20 is connected at its outlet side to a position between the valve 31 and the valves 32a, 32b to discharge thereto the pressurized brake fluid. In a passage which connects the auxiliary reservoir 22 to a position between the valves 32a, 32b and the outlet side of the auxiliary pressure source 20, the valve 33 is disposed to open or close the passage. A normally open two-port two-position electromagnetic valve is used for the valve 31 and the valves 32a, 32b in this system, while a normally closed two-port two-position electromagnetic valve is used for the valve 33. The wheel cylinders 51, 52 may be communicated with the master cylinder 12 through a pair of check valves 41, 42 which are disposed therebetween, respectively, for permitting the brake fluid to flow in the direction toward the master cylinder 12 and preventing the brake fluid from flowing in the reverse direction. If the brake pedal 10 is released, therefore, each of the wheel cylinders 51, 52 will be immediately decreased down to the pressure in the reservoir 13.

In the normal braking operation of the above described system, when the brake pedal 10 is depressed, the brake fluid is discharged from the master cylinder 12 to apply the master cylinder pressure to the wheel cylinders 51, 52 through the valve 31 and the valves 32a, 32b. When the pressure control for the anti-skid control mode is initiated, the valve 31 is placed in its closed position to shut off the communication between the master cylinder 12 and the wheel cylinders 51, 52, and both the valves 32a, 32b are placed in the closed positions to hold the pressures in the wheel cylinders 51, 52. At the same time, the auxiliary pressure source 20 is started to discharge the pressurized brake fluid, and the valve 33 is placed in its open position. Then, if the decrease mode is selected for the wheel FR, the valve 32a is placed in its open position to communicate the wheel cylinder 51 with the auxiliary reservoir 22 through the valve 32a and the valve 33, the brake fluid in the wheel cylinder 51 is discharged to the auxiliary reservoir 22 thereby to decrease the pressure in the wheel cylinder 51. During this operation, the brake fluid discharged from the auxiliary pressure source 20 is circulated through the valve 33 which is placed in its open position and the auxiliary reservoir 22, so that the operation for decreasing the pressure will not be affected by the auxiliary pressure source 20. When the valve 33 is placed in its closed position to shut off the passage, the brake fluid in the auxiliary reservoir 22 is fed to the wheel cylinder 51 through the valve 32a which is placed in its open position to increase the pressure in the wheel cylinder 51. With the valve 32a held in its open position, the valve 33 is placed in its closed position, and then the valve 31 is placed in its open position, so that the system returns to the condition as shown in FIG. 1, where the pressure in the master cylinder 12 can be increased in response to a depression of the brake pedal 10. Accordingly, during the pressure control in the wheel cylinder 51, if the valve 32b is placed in its closed position, the pressure in the wheel cylinder 52 is held to provide a hold mode, so that the wheel RL will not be affected by the braking force control operation for the wheel FR. With the hold mode selected effectively, therefore, the independent braking force control for each wheel can be made, in either the diagonal dual circuits system or the front and rear dual circuits system.

The outlet side of the auxiliary pressure source 20 may be connected to the master cylinder 12 through a check valve 45, which permits the brake fluid to flow in the direction toward the master cylinder 12 and restrains the reverse flow. When the brake pedal 10 is released and the pressure in the master cylinder 12 becomes lower than the pressure of the brake fluid discharged from the auxiliary pressure source 20, the discharged brake fluid will be returned to the master cylinder 12 and the reservoir 13 through the check valve 45.

Figure 4:
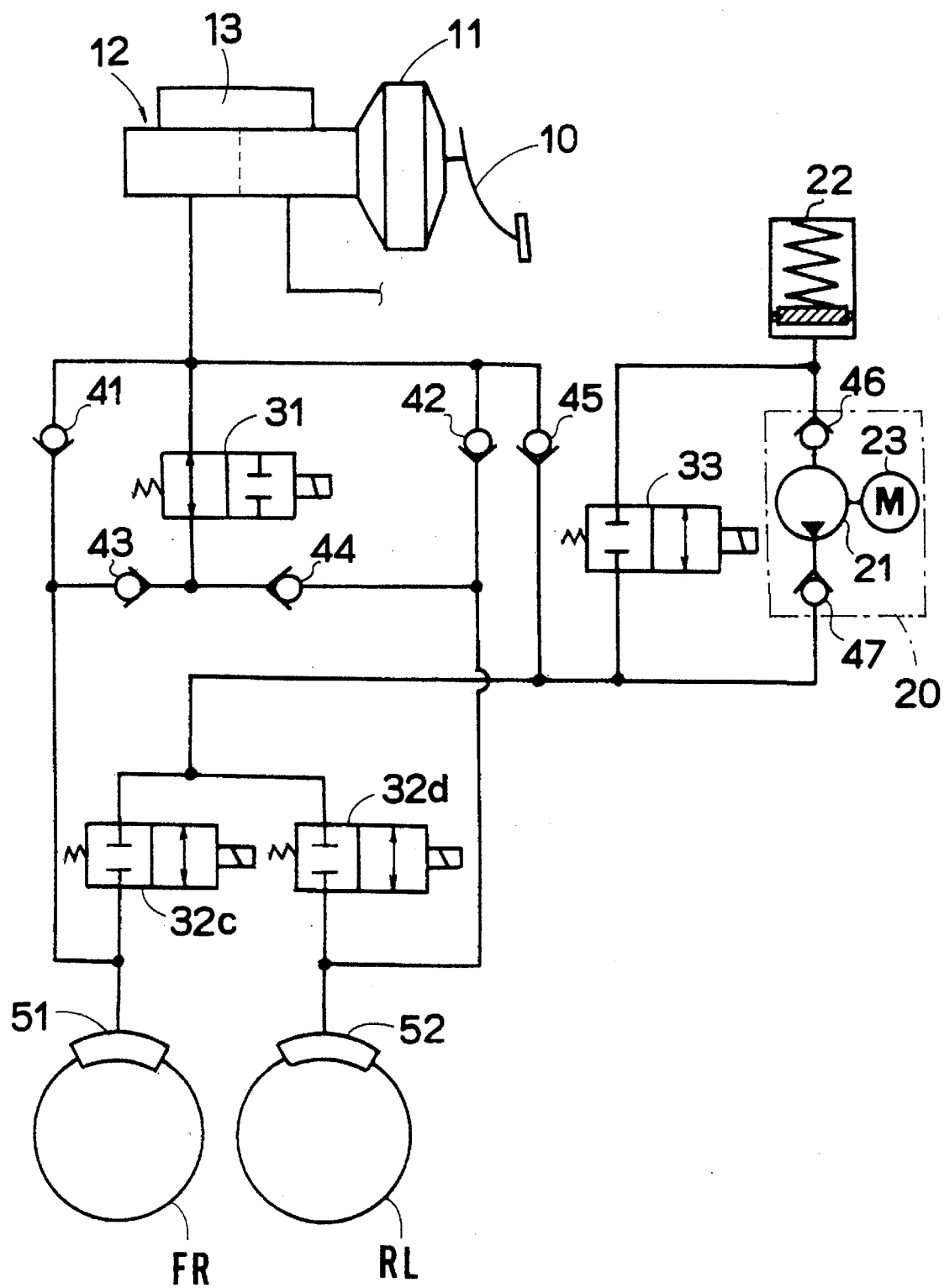
FIG. 4 is a schematic block diagram of a fourth basic system for a hydraulic braking system according to the present invention.

In the fourth basic system as shown in FIG. 4, the valve 31 is provided for opening or closing the communication between the master cylinder 12 and the wheel cylinders 51, 52, and the outlet side of the auxiliary pressure source 20 is connected with each position between the valve 31 and the wheel cylinder 51 and between the valve 31 and the wheel cylinder 52. A pair of valves 32c, 32d are disposed between the outlet side of the auxiliary pressure source 20 and each of the wheel cylinders 51, 52, respectively. The valve 33 is disposed in a passage which connects the auxiliary reservoir 22 to a position between the valves 32c, 32d and the outlet side of the auxiliary pressure source 20. According to the system in FIG. 4, in the normal braking operation, when the brake pedal 10 is depressed, the brake fluid is discharged from the master cylinder 12 to apply the master cylinder pressure through the valve 31 which is placed in its open position. When the pressure control for the anti-skid control mode is initiated, the valve 31 is placed in its closed position to shut off the communication between the master cylinder 12 and the wheel cylinders 51, 52. At the same time, the auxiliary pressure source 20 is started to discharge the pressurized fluid, and the valve 33 is placed in its open position. At this time, the valves 32c, 32d have been placed in the closed positions, the pressures in the wheel cylinders 51, 52 are held. Thereafter, the system operates similarly to the system as shown in FIG. 3. In this system, the normally open two-port two-position electromagnetic valve is used for the valve 31, while the normally closed two-port two-position electromagnetic valve is used for the valves 32c, 32d. The check valves 41, 42 are disposed between the master cylinder 12 and the wheel cylinders 51, 52, as in the system in FIG. 3. In addition, a pair of check valves 43, 44 are disposed between the valve 31 and the wheel cylinders 51, 52, respectively, to permit the brake fluid to flow in the direction toward the wheel cylinders 51, 52 and restraining the reverse flow. With the check valves 43, 44, the brake fluid is appropriately separated to be supplied to the wheel cylinders 51, 52. That is, when the brake fluid is supplied to the wheel cylinders 51, 52 through the valve 31 which is placed in its open position, the pressure difference between the wheel cylinders 51, 52 is maintained, so that the individual pressure control can be made with respect to each of the wheel cylinders 51, 52.

Figure 5:
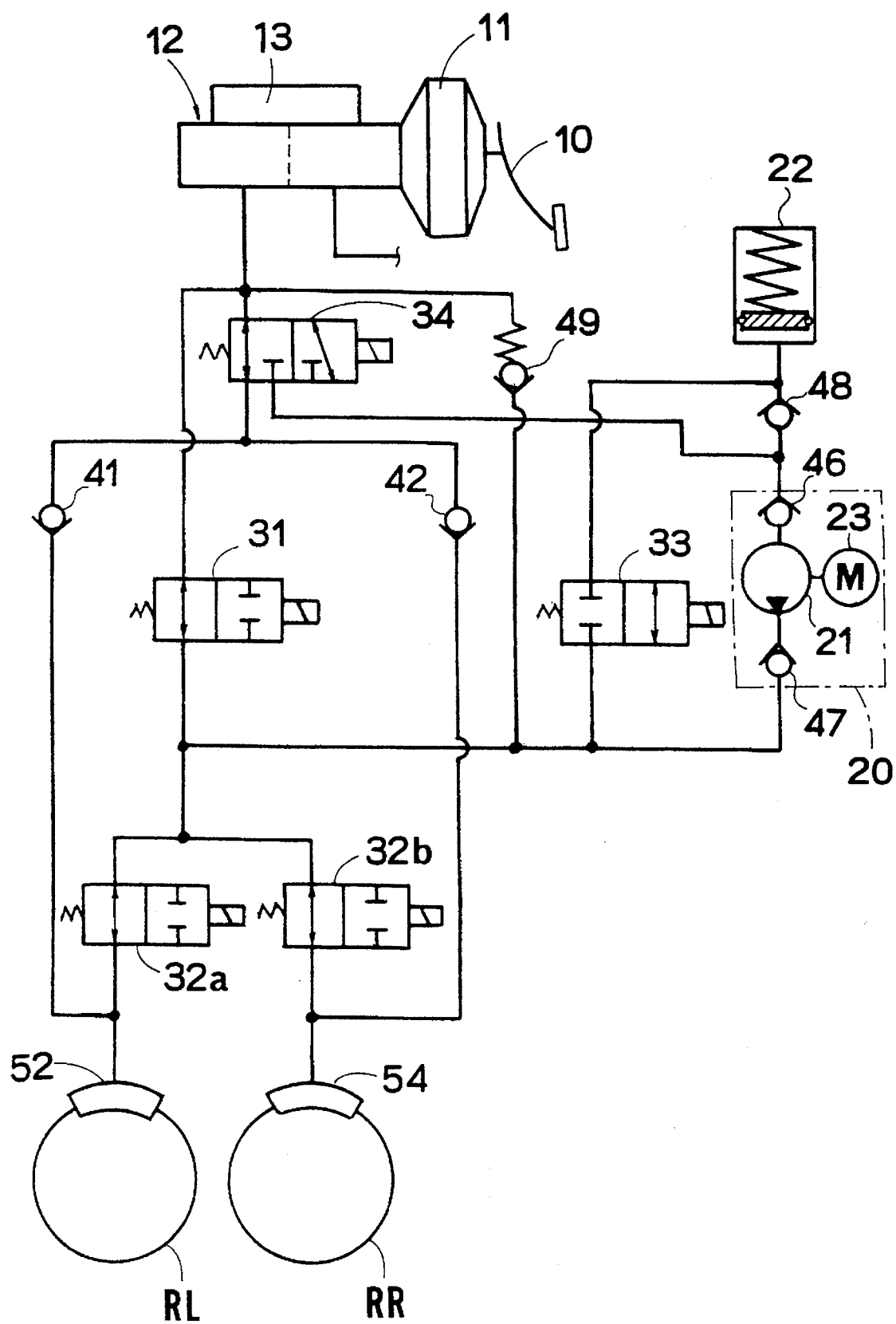
FIG. 5 is a schematic block diagram of a fifth basic system for a hydraulic braking system according to the present invention.
Figure 6:
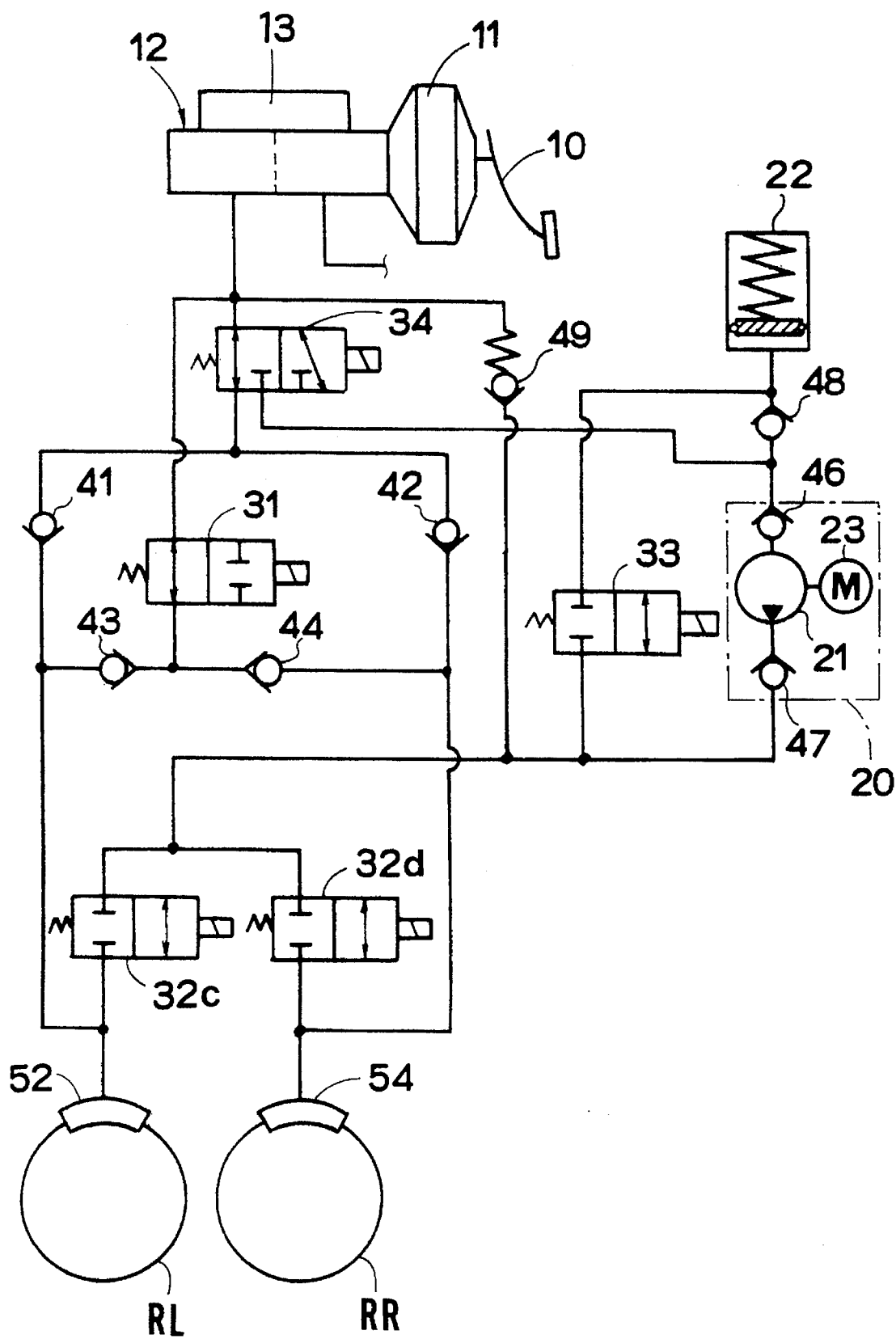
FIG. 6 is a schematic block diagram of a sixth basic system for a hydraulic braking system according to the present invention.

In the fifth and sixth basic systems as shown in FIGS. 5 and 6, a changeover valve such as a valve 34 is provided further in the basic systems as shown in FIGS. 3 and 4, respectively. The valve 34 is disposed between the master cylinder 12 and the check valves 41, 42, so as to be selectively placed in a first position where the check valves 41, 42 are communicated with the master cylinder 12, and where the communication between the inlet side of the auxiliary pressure source 20 and the master cylinder 12 is shut off, or a second position where the communication between the check valves 41, 42 and the master cylinder 12 is shut off, and where the inlet side of the auxiliary pressure source 20 is communicated with the master cylinder 12. The valve 34 is disposed in the hydraulic braking pressure circuits provided for driven wheels, e.g. the rear wheels RL, RR as shown in FIG. 5. In the normal braking operation, and also in the anti-skid control mode, the valve 34 is placed in the first position, while the valve 34 is placed in the second position when the traction control mode is initiated. In the traction control mode, therefore, the communication between the check valves 41, 42 and the master cylinder 12 is shut off, whereas the inlet side of the auxiliary pressure source 20 is communicated with the master cylinder 12 through the valve 34. Consequently, when the auxiliary pressure source 20 is driven, the brake fluid is introduced thereinto from the master cylinder 12 and the reservoir 13, and the pressurized brake fluid is discharged to the wheel cylinders 52, 54 for applying the braking force to the wheels RL, RR. Thereafter, the pressure in each of the wheel cylinders 52, 54 is controlled to prevent the wheels RL, RR from slipping in the acceleration operation, with the aforementioned valves actuated in the same manner as done in the anti-skid control mode.

In those basic systems as shown in FIGS. 5 and 6, a check valve 48 is disposed between the auxiliary reservoir 22 and the check valve 46 which is disposed at the inlet side of the auxiliary pressure source 20. With the check valve 48, the brake fluid is permitted to flow in the same direction as it flows through the check valve 46 and prevented from flowing in the reverse direction. Whereby, the brake fluid is prevented from flowing into the auxiliary reservoir 22 through the valve 34. As shown in FIGS. 5 and 6, a relief valve 49 may be provided for returning the brake fluid to the reservoir 13 through the master cylinder 12 when the pressure of the brake fluid discharged from the auxiliary pressure source 20 exceeds a predetermined pressure. With the relief valve 49, the pressure of the brake fluid discharged from the auxiliary pressure source 20 is maintained at the predetermined value, so that the brake fluid pressurized at the pressure less than the predetermined value may be used in the traction control mode or the vehicle stability control mode.

Figure 7:
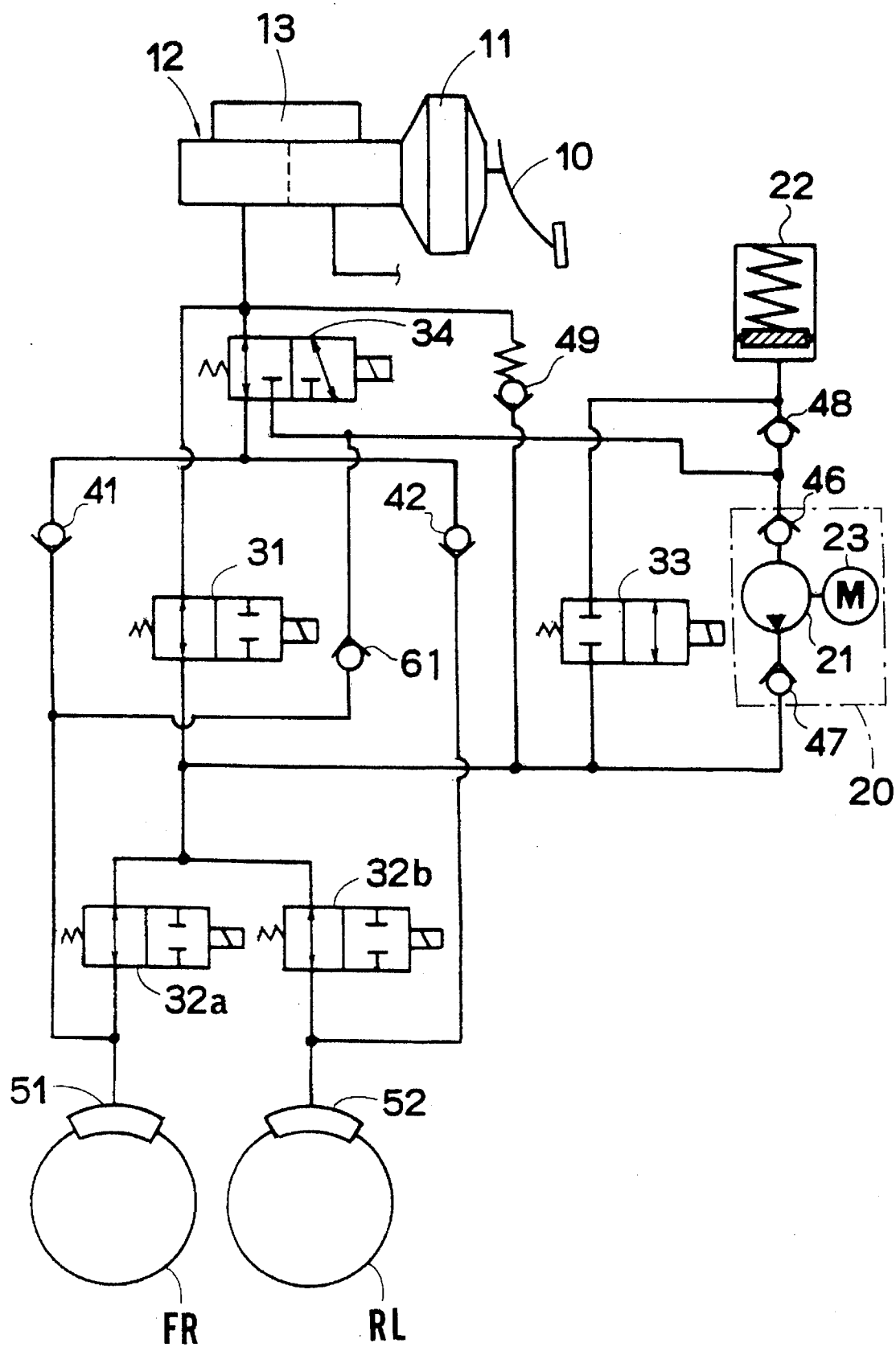
FIG. 7 is a schematic block diagram of a seventh basic system for a hydraulic braking system according to the present invention.
Figure 8:
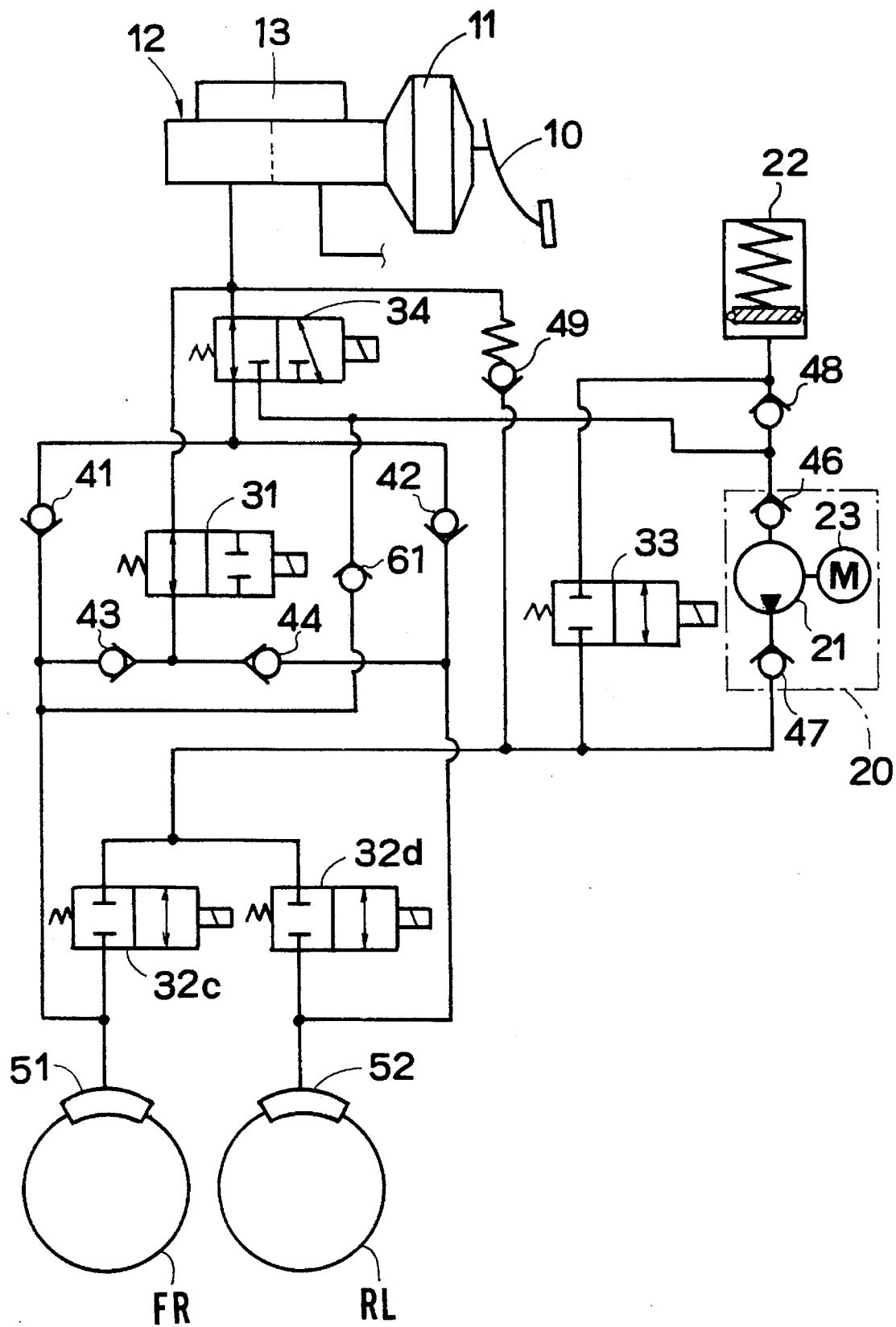
FIG. 8 is a schematic block diagram of an eight basic system for a hydraulic braking system according to the present invention.
Figure 9:
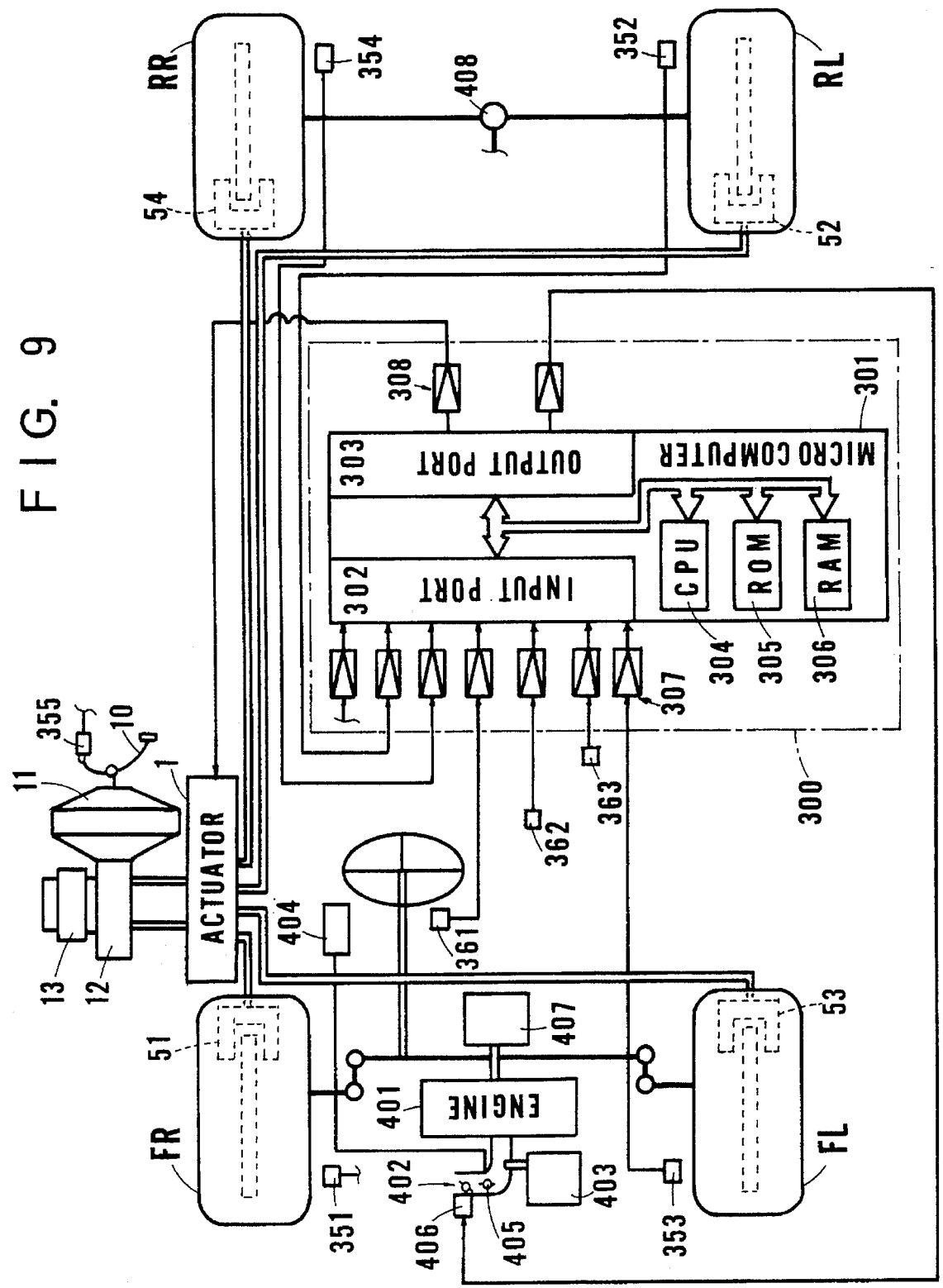
FIG. 9 is a block diagram illustrating the whole vehicle control system including an electronic controller.

In the seventh and eighth basic systems as shown in FIGS. 7 and 8, a check valve 61 is provided further in the basic systems as shown in FIGS. 3 and 4, as well as the valve 34 as shown in FIGS. 5 and 6, respectively. The check valve 61 is disposed between at least one of the wheel cylinders 51, 52, e.g. the wheel cylinder 51 and a passage which communicates the valve 34 with the inlet side of the auxiliary pressure source 20, so as to permit the brake fluid to flow in the direction toward the wheel cylinder 51 and restrain the reverse flow. According to those system as shown in FIGS. 7 and 8, therefore, even in the traction control mode or the vehicle stability control mode, if the brake pedal 10 is depressed, the master cylinder pressure will be fed to the wheel cylinder 51 through the check valve 61. Therefore, it is not necessary to detect the operation of the brake pedal 10 by a pressure sensor or the like, but if the brake pedal 10 is depressed, the braking operation will be effectively made and continued in response to the depression of the brake pedal 10. In addition, an orifice (not shown in FIGS. 7 and 8) may be provided along with the check valve 61 for adjusting the pressure of the brake fluid fed to the wheel cylinders 51, 52.

FIG. 9 illustrates a vehicle control system as a whole for providing various control modes including the anti-skid control mode, traction control mode, vehicle stability control mode or the like. One of the first to thirteenth embodiments, which are disclosed in FIGS. 10–22 and will be explained hereinafter, is formed, with appropriate electromagnetic valves, the aforementioned auxiliary pressure source 20, and etc. disposed in a braking force control apparatus which is indicated as an actuator 1 in FIG. 9. Referring to FIG. 9, an engine 401 is an internal combustion engine provided with a throttle control device 402 and a fuel injection device 403. The throttle control device 402 includes a main throttle valve 405 for controlling a main throttle opening angle in response to an operation of an accelerator pedal 404, and a sub-throttle valve 406 for controlling a sub-throttle opening angle in response to an output of an electronic controller 300 which corresponds to the controller according to the present invention. The fuel injection device 403 is also controlled by the controller 300 to regulate the amount of fuel injected into the engine 401. The rotational force of the engine 401 is transmitted to the rear wheels RL, RR via a shift control device 407 and a differential gear 408, so that a so-called FR system (front-engine, rear-drive) is employed in FIG. 9. According to the embodiment as shown in FIG. 16 or the like which will be explained later, however, a FF system (front-engine, front-drive) is employed.

With respect to the braking system, a tandem master cylinder is employed as the master cylinder 12, which is associated with the reservoir 13 and the booster 11. Wheel cylinders 51, 53, 52, 54 are operatively mounted on the wheels FR, FL, RL, RR, respectively, and one of the embodiments as shown in FIGS. 10–22 is formed. The wheel FR designates a road wheel at the fore right side as viewed from the position of a driver's seat, the wheel FL designates a road wheel at the fore left side, the wheel RR designates a road wheel at the rear right side, and the wheel RL designates a road wheel at the rear left side. At the wheels FR, RL, FL and RR, there are provided wheel speed sensors 351 to 354 respectively, which are connected to the electric controller 300, and by which a pulse signal with the number of pulses proportional to a rotational speed of each wheel, i.e., a wheel speed signal is fed to the electronic controller 300. There are also provided a brake switch 355 which is turned on when the brake pedal 10 is depressed, a front steering angle sensor 361 for detecting a steering angle of the front wheels FR, FL, a yaw rate sensor 362 for detecting a yaw rate of the vehicle, a lateral acceleration sensor 363 and the like. These are electrically connected to the electronic controller 300. According to the yaw rate sensor 362, a varying rate of rotational angle of the vehicle about a vertical line on the center of gravity of the vehicle, i.e., a yaw angular velocity or yaw rate is detected and fed to the electronic controller 300 as an actual yaw rate Yr. Furthermore, throttle sensors (not shown) for detecting the opening angles of the main throttle valve 405 and the sub-throttle valve 406 are connected to the electronic controller 300.

The above-described structure as shown in FIG. 9 is basically applicable to any embodiments disclosed in FIGS. 10–22. However, in dependence upon the embodiments, the front steering wheel sensor or the like may be eliminated as in the embodiment in FIG. 10 for example, to provide a relatively simple system at a relatively low cost. The yaw rate Yr may be estimated on the basis of the wheel speed differential Vfd of the wheel speeds of the left and right non-driven wheels (wheels FL, FR in FIG. 7). Therefore, the signals detected by the wheel speed sensors 351, 352 may be used for estimating the yaw rate Yr, whereby the yaw rate sensor 362 may be eliminated. Furthermore, a steering angle control device (not shown) may be disposed between the wheels RL, RR, whereby the steering angles of the wheels RL, RR may be controlled by a motor (not shown) in response to the output of the electronic controller 300. In the case where the vehicle stability control mode is not provided, but only the traction control mode may be selected in such an embodiment as shown in FIG. 16 for example, then it is of course unnecessary to install the yaw rate sensor 362 and etc.

As shown in FIG. 9, the electronic controller 300 is provided with a microcomputer 301 having a central processing unit or CPU 304, a read-only memory or ROM 305 and a random access memory or RAM 306, which are connected with an input port 302 and an output port 303 via a common bus to execute the input/output operations relative to external circuits. The signals detected by each of the wheel speed sensors 351 to 354, the brake switch 355, the front steering angle sensor 361, the yaw rate sensor 362, the lateral acceleration sensor 363 and the like are fed to the input port 302 via respective amplification circuits 307 and then to the CPU 304. Then, a control signal is output from the output port 303 to the actuator 1 and the throttle control device 402 via respective drive circuits 308. In the microcomputer 301, the ROM 305 memorizes a program corresponding to flowcharts shown in FIGS. 23 and 24, the CPU 304 executes the program while the ignition switch (not shown) is closed, and the RAM 306 temporarily memorizes various data necessary for executing the program. A plurality of microcomputers may be used for the throttle control mode and the like, respectively, or some of them for providing related, control modes may be combined together electrically.

The embodiments employed in the braking system as shown in FIG. 9 will be described with reference to FIGS. 10–22, hereinafter. In the following description, structural elements, which are described in FIGS. 10–22 and equivalent to those described in FIGS. 1–8, will be designated by corresponding reference numerals with different hundred-series numerals preceding them, for example "100" for the first braking pressure circuit, and "200" for the second braking pressure circuit.

Figure 10:
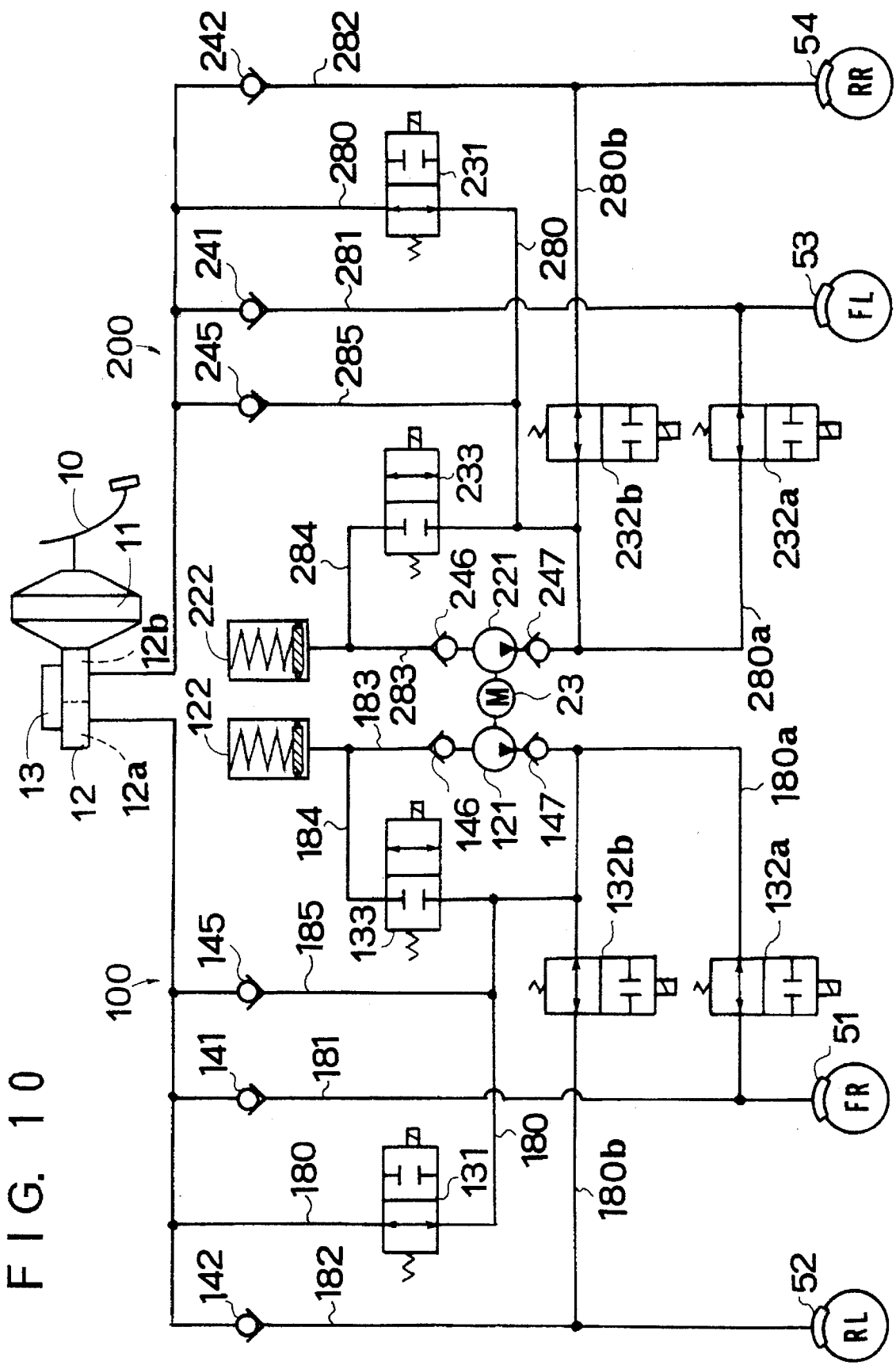
FIG. 10 is a schematic block diagram of a hydraulic braking system according to a first embodiment of the present invention.
Figure 11:
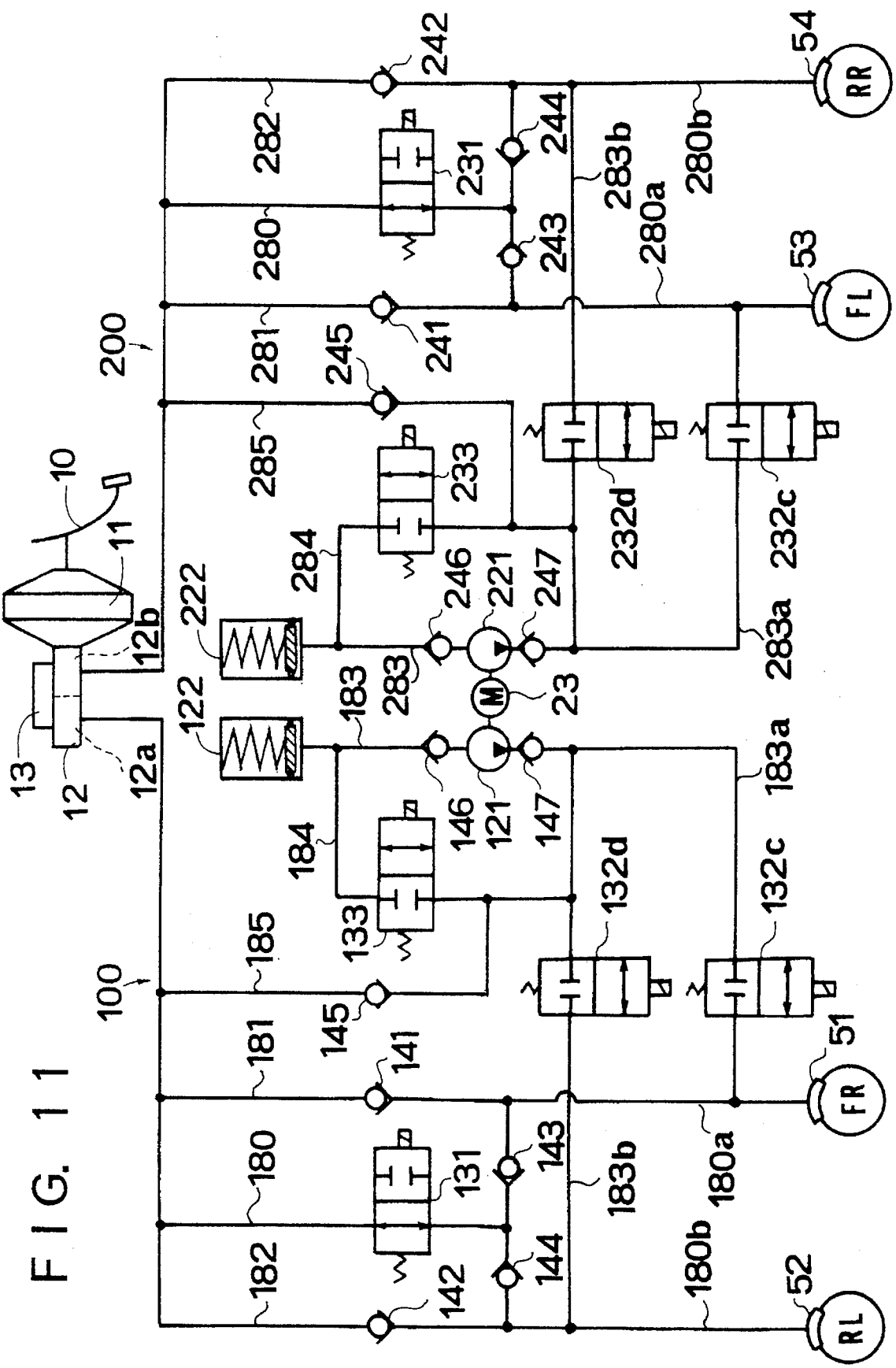
FIG. 11 is a schematic block diagram of a hydraulic braking system according to a second embodiment of the present invention.
Figure 16:
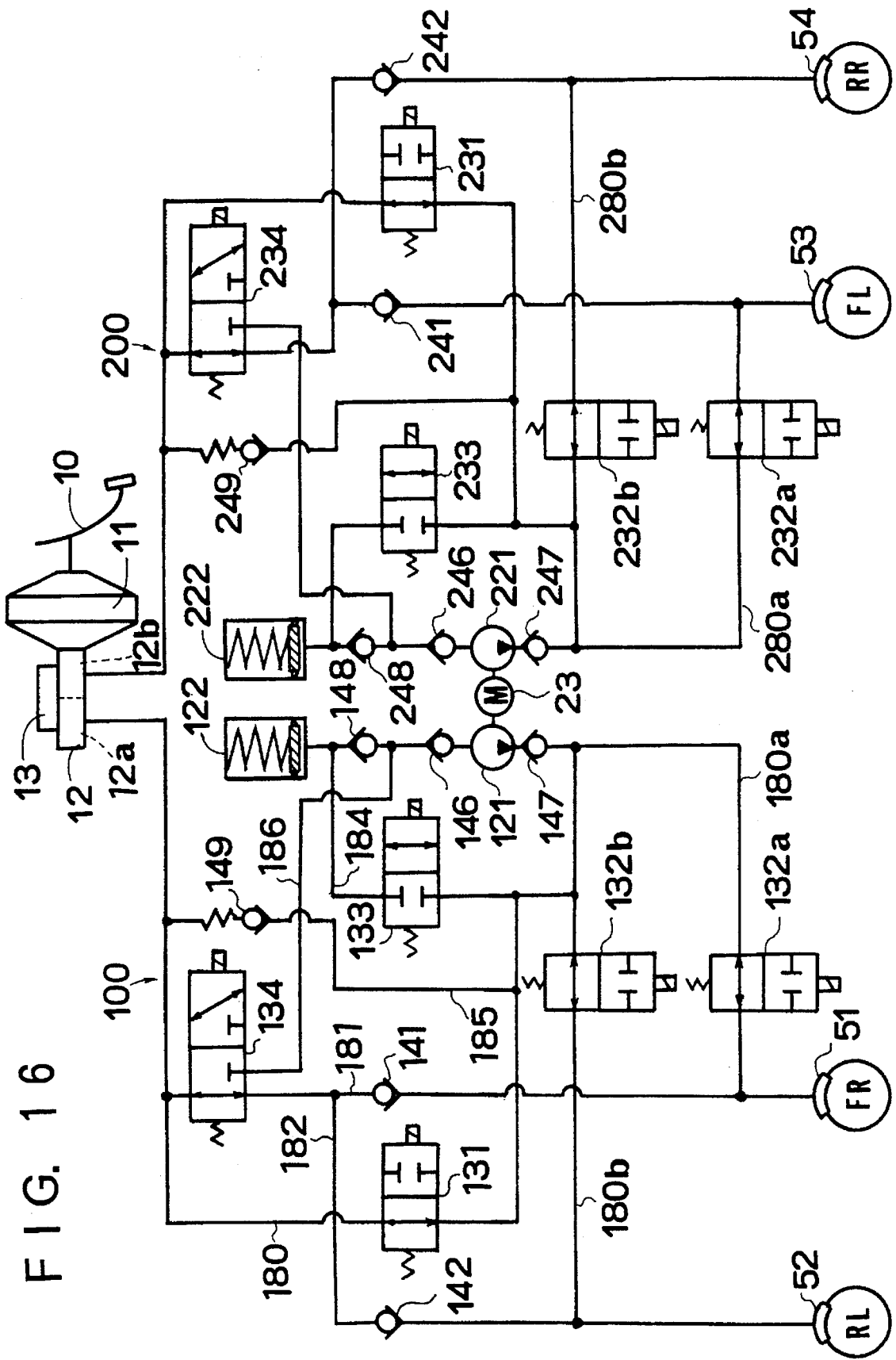
FIG. 16 is a schematic block diagram of a hydraulic braking system according to a seventh embodiment of the present invention.
Figure 17:
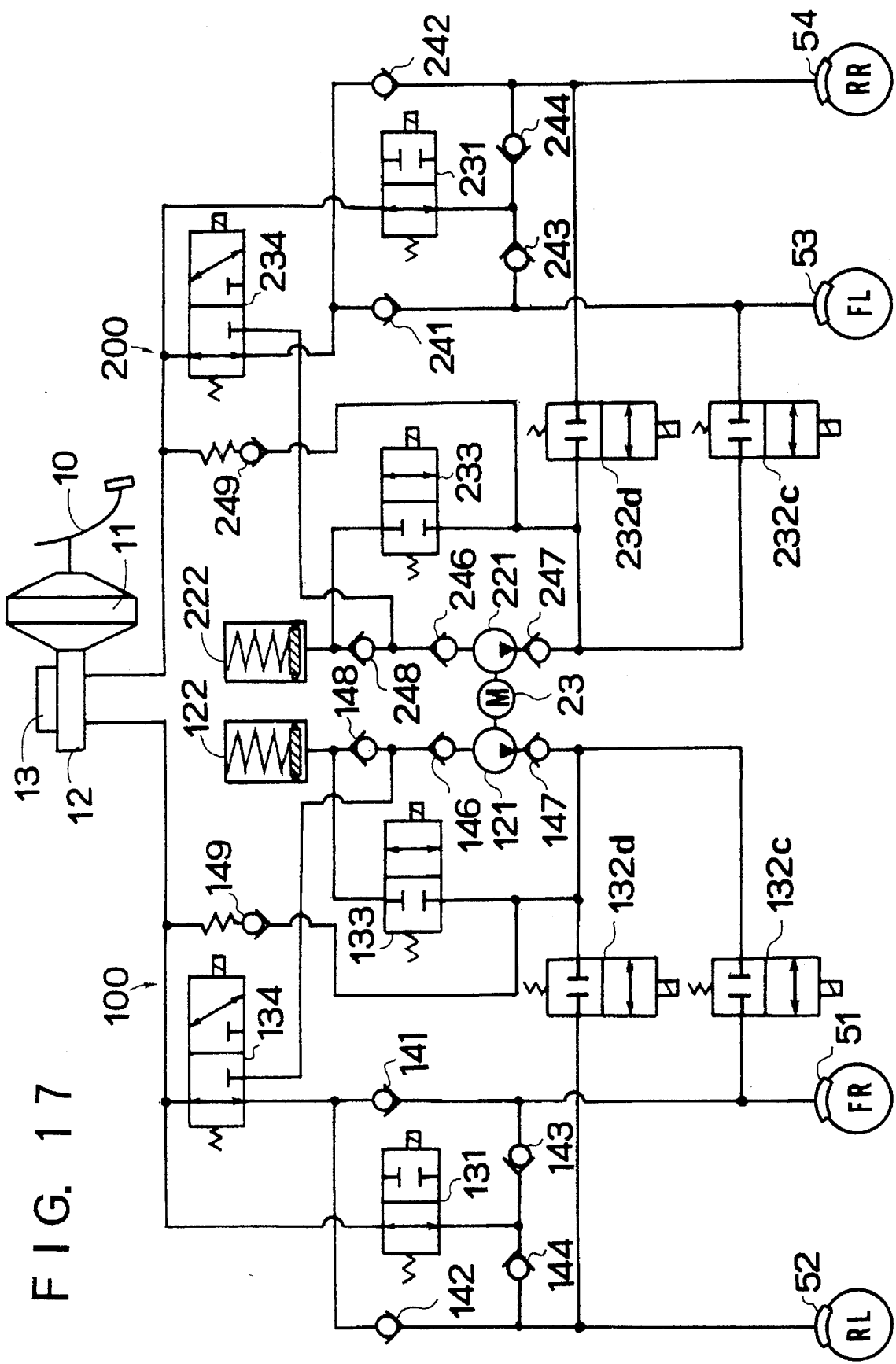
FIG. 17 is a schematic block diagram of a hydraulic braking system according to a eighth embodiment of the present invention.
Figure 18:
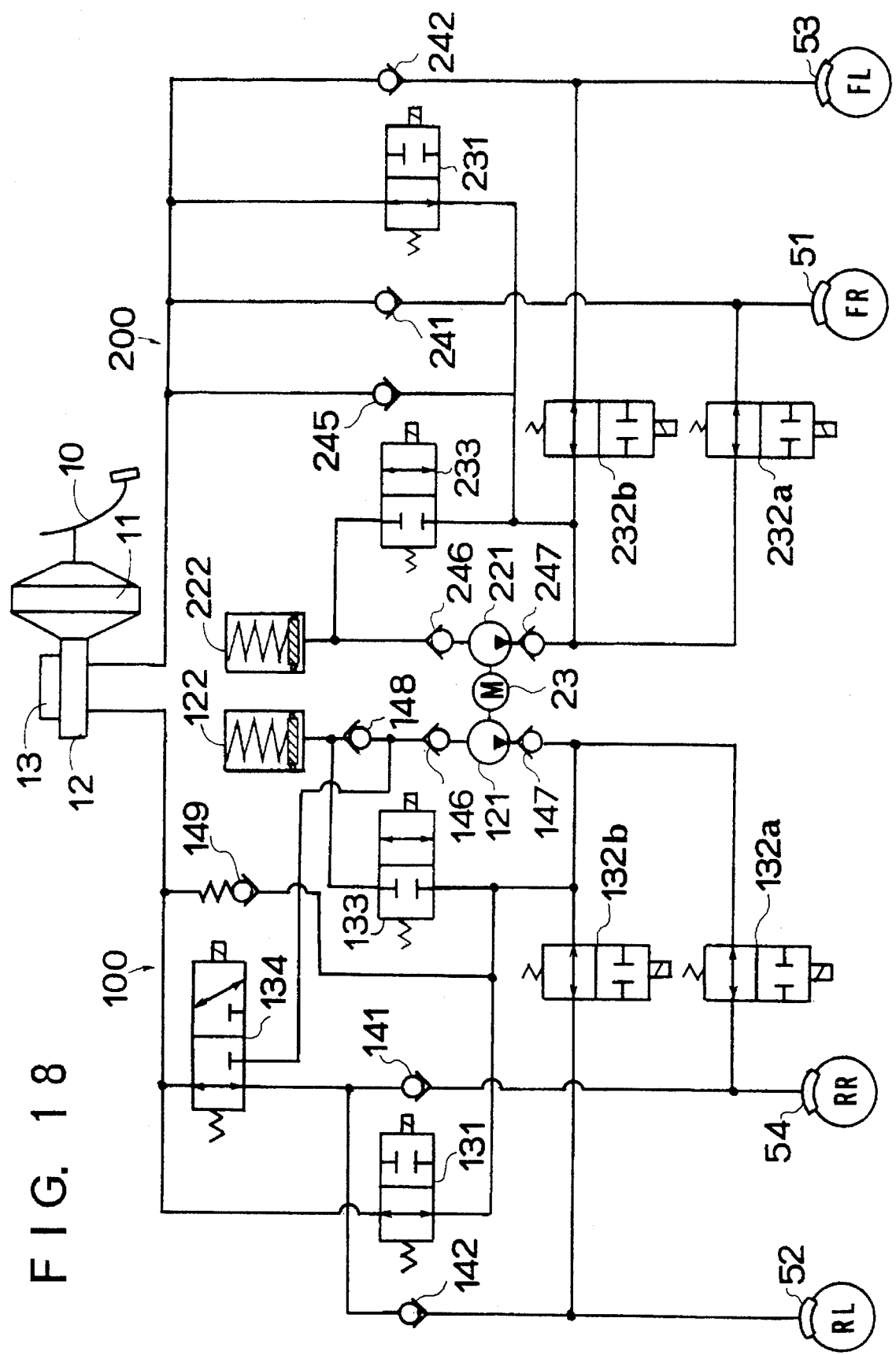
FIG. 18 is a schematic block diagram of a hydraulic braking system according to a ninth embodiment of the present invention.
Figure 19:
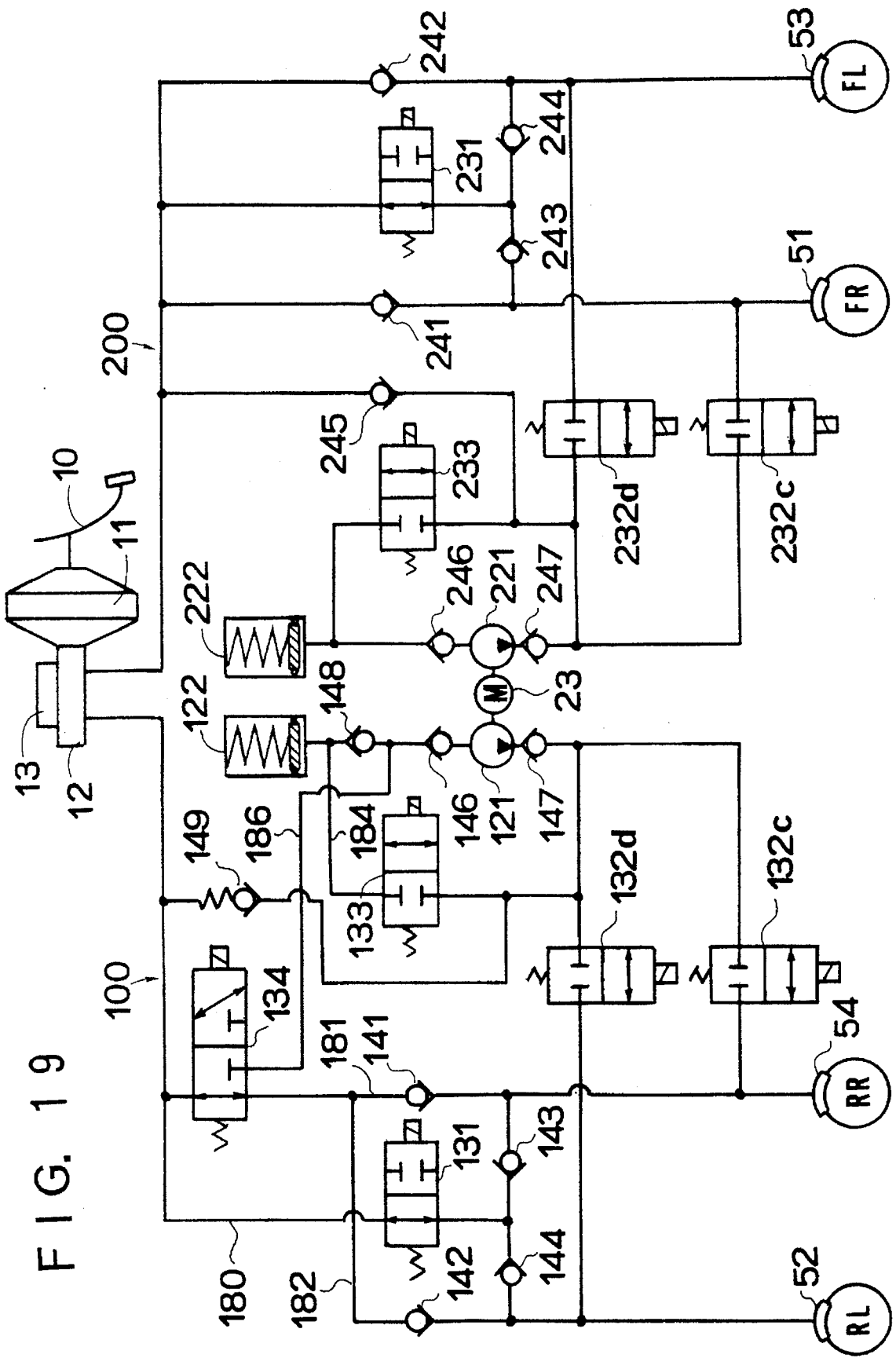
FIG. 19 is a schematic block diagram of a hydraulic braking system according to a tenth embodiment of the present invention.
Figure 20:
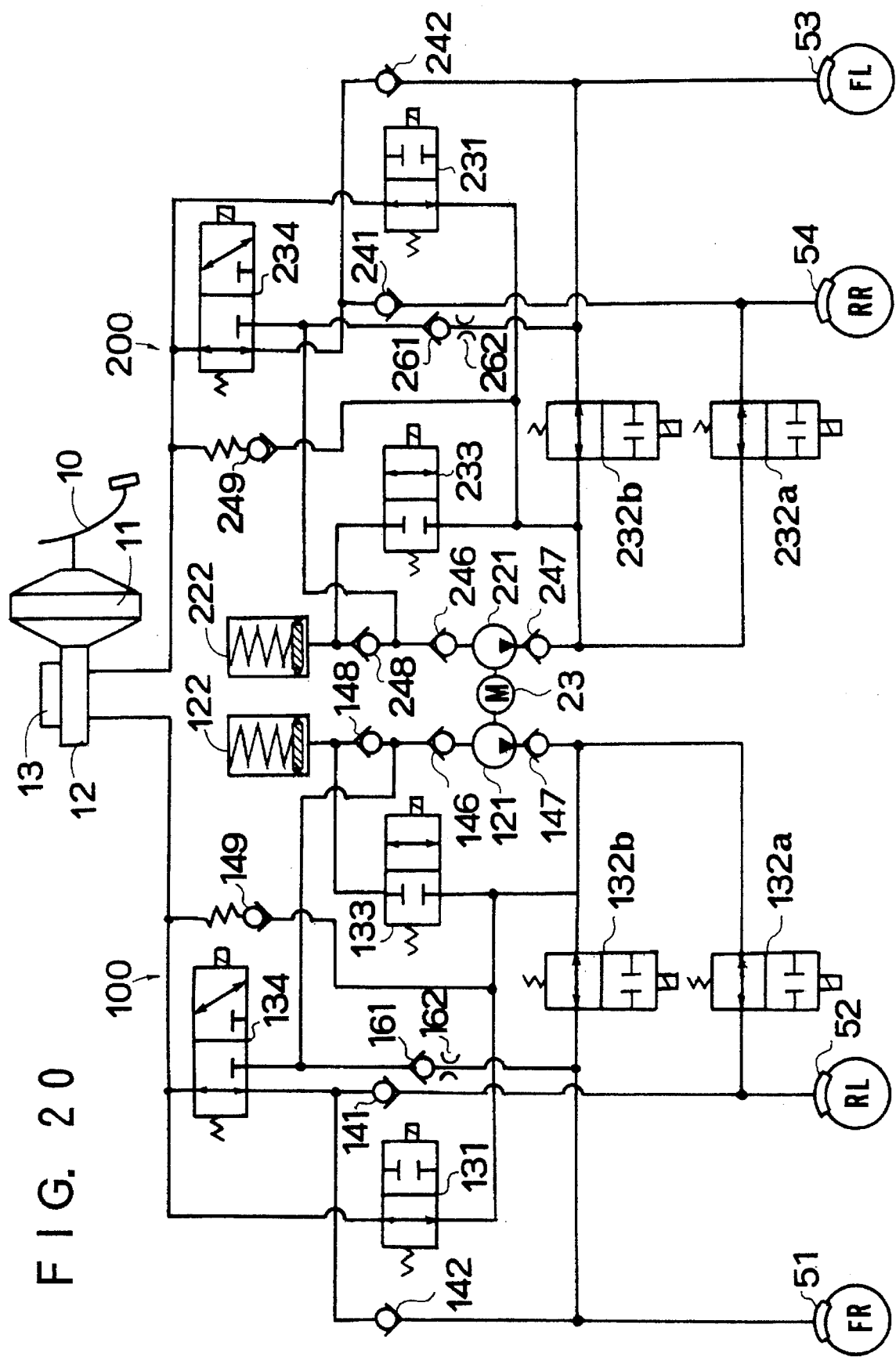
FIG. 20 as a schematic block diagram of a hydraulic braking system according to a eleventh embodiment of the present invention.
Figure 21:
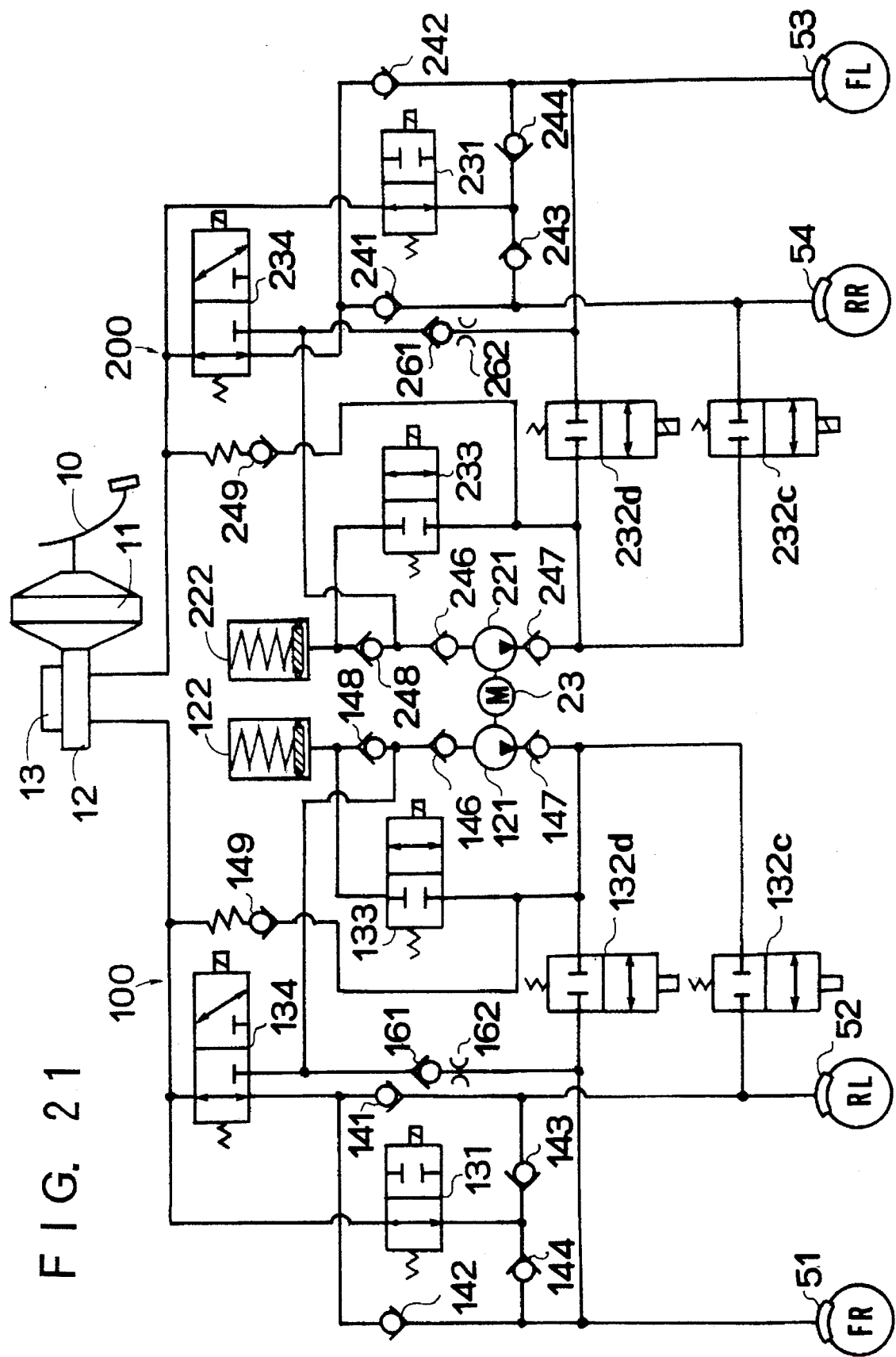
FIG. 21 as a schematic block diagram of a hydraulic braking system according to a twelfth embodiment of the present invention.
Figure 22:
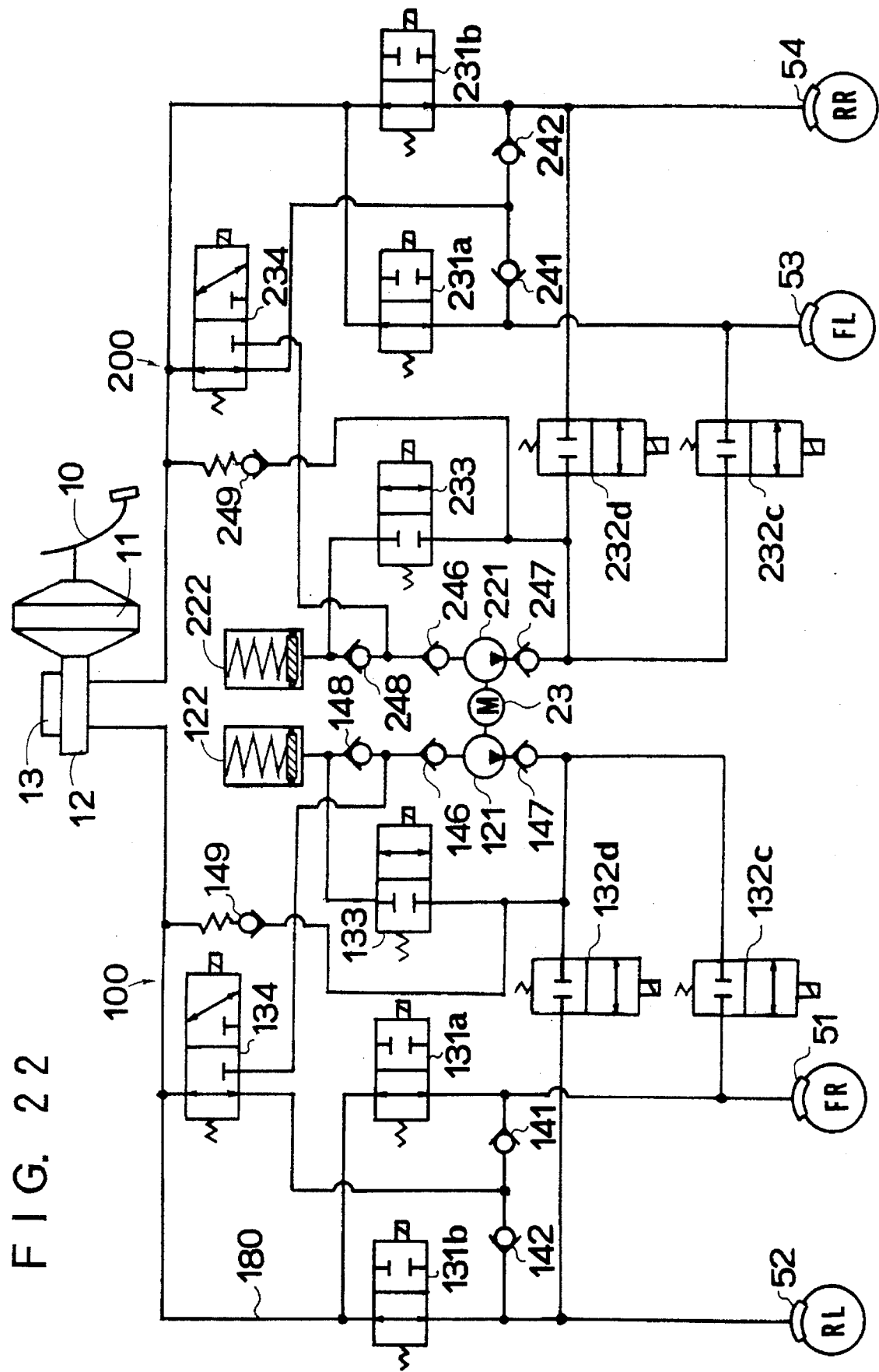
FIG. 22 is a schematic block diagram of a hydraulic braking system according to a thirteenth embodiment of the present invention.

FIGS. 10 and 11 illustrate the first and second embodiments, respectively, wherein the first and second hydraulic braking pressure circuits 100, 200 are formed as the same diagonal dual circuits, each of which may provide the anti-skid control mode as a basic function provided in FIGS. 3 and 4. FIGS. 12–15 relate to the third to sixth embodiments, each of which forms the front and rear dual circuits, and at the front wheels' side of which the anti-skid control mode as shown in FIG. 3 or FIG. 4 may be provided. FIGS. 16 and 17 illustrate the seventh and eighth embodiments, respectively, which are applied to the FF (front-engine, front-drive) vehicle, and which provide the traction control mode in addition to the embodiments as shown in FIGS. 10 and 11, respectively. FIGS. 18 and 19 relate to the ninth and tenth embodiments which form the front and rear dual circuits, and which are applied to the FR (front-engine, rear-drive) vehicle, and which may provide the traction control mode in addition to the embodiments as shown in FIGS. 10 and 11. FIGS. 20 and 21 illustrate the eleventh and twelfth embodiments, which are formed on the basis of the embodiments as shown in FIGS. 10 and 11 to provide the vehicle stability control mode. And, FIG. 22 illustrates the thirteenth embodiment in which a so-called cut-off valve is provided for each wheel cylinder, and which is adapted to provide the vehicle stability control mode.

FIG. 10 shows a first embodiment of the present invention, wherein both the first and second hydraulic braking pressure circuits 100, 200 are formed as the diagonal dual circuits, but they may be formed as the front and rear dual circuits. The present embodiment is installed in a front drive vehicle, whose front wheels FL, FR are driven by an engine and whose rear wheels RL, RR are not driven, but may be installed in a rear drive vehicle. Each of the first and second hydraulic braking pressure circuits 100, 200 is divided into the master cylinder system, the wheel cylinder system and the pressure control system.

At the outset, the master cylinder section is arranged in the same manner as shown in FIG. 9, wherein two pressure chambers of the tandem master cylinder 12 are connected to the first and second hydraulic braking pressure circuits 100, 200, respectively. That is, the first pressure chamber 12a is connected to the first hydraulic braking pressure circuit 100, while the second pressure chamber 12b is connected to the second hydraulic braking pressure circuit 200. The booster 11 may be of either vacuum type or hydraulic type. In the first hydraulic braking pressure circuit 100 for the wheel cylinders 51, 52, the first pressure chamber 12a is communicated with the wheel cylinders 51, 52 through a main hydraulic passage 180 and its brach passages 180a, 180b, respectively. In the main hydraulic passage 180, is disposed a normally open two-port two-position electromagnetic valve 131 (hereinafter, simply referred to as valve 131) which constitutes the first valve according to the present invention, and which corresponds to the valve 31 in the basic systems. Also, in the brach passages 180a, 180b, are disposed normally open two-port two-position electromagnetic valves 132a, 132b (hereinafter, simply referred to as valves 132a, 132b), respectively. These valves 132a, 132b and the wheel cylinders 51, 52 are included in the wheel cylinder section. The wheel cylinders 51, 52 are communicated with the first pressure chamber 12*a* of the master cylinder 12 through the return passages 181, 182 for returning the hydraulic fluid to the master cylinder 12, in which the check valves 141, 142 are disposed, respectively. These check valves 141, 142 are provided for permitting the brake fluid to flow in the direction toward the master cylinder 12 and restraining the reverse flow, whereby the hydraulic pressure in each of the wheel cylinders 51, 52 is immediately decreased down to the pressure in the master cylinder 12 at the time when the brake pedal 10 has been released, i.e. the pressure in the reservoir 13.

The pressure control section is arranged in the same manner as shown in FIG. 1 to constitute the auxiliary pressure source 20, so that a fluid pump 121 is disposed in a passage 183 which is connected to the brach passages 180*a*, 180*b*. The fluid pump 121 has an inlet which is communicated with the auxiliary reservoir 122 through a check valve 146, and an outlet which is communicated with the brach passages 180*a*, 180*b*, and communicated with the wheel cylinders 51, 52, respectively, via the valves 132*a*, 132*b* and a check valve 147. The fluid pump 121 is adapted to be driven by a single electric motor 23 together with a fluid pump 221, so as to introduce the brake fluid from the inlet and discharge from the outlet the brake fluid which has been pressurized and raised to a predetermined pressure. The check valves 146, 147 are adapted to limit the brake fluid discharged from the fluid pump 121 to flow in a predetermined direction. An auxiliary reservoir 122 is provided separately from the reservoir 13 of the master cylinder 12 for storing a sufficient amount of brake fluid required for various control modes which will be described later, and the auxiliary reservoir 122 is sometimes called as an accumulator.

A position between the check valve 147 provided at the outlet side of the fluid pump 121 and the valves 132*a*, 132*b* is connected to a position between the check valve 146 provided at the inlet side of the fluid pump 121 and the auxiliary reservoir 122, by a circulation passage 184, in which a normally closed two-port two-position electromagnetic valve 133 (hereinafter, simply referred to as valve 133) is disposed. The valve 133 constitutes the auxiliary valve according to the present invention and corresponds to the valve 33 in the basic systems. A position between the valve 133 and the check valve 147 at the outlet side of the fluid pump 121 is connected to the first pressure chamber 12*a* of the master cylinder 12 by a return passage 185, in which a check valve 145 is disposed. The check valve 145 is provided for permitting the brake fluid to flow in the direction toward the master cylinder 12 and restraining the reverse flow. When the brake pedal 10 is released, therefore, the brake fluid which has been remained in the master cylinder 12 at that time is returned to the master cylinder 12 through the check valve 145.

Accordingly, when the valve 133 is energized to open the circulation passage 184, the brake fluid is supplied to the auxiliary reservoir 122 to store therein the brake fluid. When the fluid pump 121 is driven, the brake fluid in the auxiliary reservoir 122 is sucked by the fluid pump 121 and discharged from its outlet through the check valve 147, so that the discharged brake fluid is circulated into the inlet of the fluid pump 121 through the circulation passage 184. The second hydraulic braking pressure circuit 200 is constituted in the same manner as described above, so that a fluid pump 221 is driven by the electric motor 23 together with the fluid pump 121. After the electric motor 23 has been started, both the fluid pump 121, 221 are continuously driven to discharge the hydraulic pressure which is increased or decreased in accordance with the rotational speed of the electric motor 23. Therefore, if one of the fluid pumps (e.g., the fluid pump 221) subjects to relatively small load, the other one of the fluid pumps (e.g., the fluid pump 121) is capable of being driven by relatively large driving force to produce a relatively large hydraulic pressure.

In operation according to the first embodiment, every valves are placed in their normal positions as shown in FIG. 10, and the electric motor 23 is stopped, during the normal braking operation. When the brake pedal 10 is depressed in that condition as shown in FIG. 10, the master cylinder 12 is actuated by the booster 11 to discharge the master cylinder pressure from the first and second pressure chambers 12*a*, 12*b* to the first and second hydraulic braking pressure circuits 100, 200. The first hydraulic braking pressure circuit 100 will be described hereinafter to represent both circuits.

In the anti-skid control operation, the valve 131 is energized to place the same in its closed position, so that the main hydraulic passage 180 is shut off to separate the master cylinder section from the wheel cylinder section. Also, each of the valves 132*a*, 132*b* is energized to be placed in its closed position, so that the brach passages 180*a*, 180*b* are shut off to hold the hydraulic pressure in the wheel cylinders 51, 52. At the same time, the electric motor 23 is started to operate the fluid pump 121 and place the valve 133 in its open position, so that the brake fluid can be communicated through the circulation passage 184. If it is determined that the wheel FR tends to be locked, for example, the control mode for the wheel cylinder 51 is changed from the hold mode to the decrease mode to place the valve 132*a* in its open position, whereby the brake fluid can be communicated through the branch passage 180*a*. Consequently, the wheel cylinder 51 is communicated with the auxiliary reservoir 122 through the valve 132*a* and the valve 133, so that the brake fluid in the wheel cylinder 51 is drained into the auxiliary reservoir 122 to decrease the hydraulic pressure in the wheel cylinder 51. During this operation, the electric motor 23 is driven continuously at a relatively low rotational speed, so that the brake fluid is discharged from the fluid pump 121. In this case, however, the brake fluid is circulated through the circulation passage 184, via the valve 133 in its open position, the auxiliary reservoir 122 and the check valves 146, 147, so that the pressure decreasing operation in the wheel cylinder 51 will not be affected by the brake fluid discharged from the fluid pump 121.

When the gradual increase mode is selected and the valve 133 is placed in its closed position to shut off the circulation passage 184, the brake fluid in the auxiliary reservoir 122 is supplied by the fluid pump 121 to the wheel cylinder 51 through the valve 132*a* in its open position. Thereafter, the electric motor 23 is driven at a constant current with a duty control thereby to control the amount of the brake fluid discharged from the fluid pump 121 to gradually increase the pressure in the wheel cylinder 51. In the case where the electric motor 23 is not provided with such a driving device having the constant current driving function, the valve 132*a* and the valve 133 are energized and de-energized alternately to increase the pressure in the wheel cylinder 51 and hold the same alternately, whereby the pressure in the wheel cylinder 51 is increased intermittently in a pulse fashion, and as a result increased gradually. Therefore, the gradual increase mode is sometimes called as a pulse-increase mode, or may be called a pumped increase mode because the pressure is increased by the fluid pump 121. Thus, the decrease mode and the gradual increase mode are switched, in accordance with the operation of the valve 133, while the valve 132*a* may also be energized and de-energized to control the pressure. When the increase mode is selected for the wheel cylinder 51, the valve 132a is placed in its open position, and the valves 132b, 133 are placed in the closed positions, respectively, then the valve 133 is placed in its open position, so that the master cylinder pressure is supplied from the master cylinder 12 to the wheel cylinder 51. When the brake pedal 10 is released and the master cylinder pressure comes to be lower than the pressure in the wheel cylinder 51, the brake fluid in the wheel cylinder 51 is returned to the master cylinder 12 through the check valve 141 and consequently to the reservoir 13. Similarly, when the master cylinder pressure come to be lower than the pressure at the outlet of the fluid pump 121, the brake fluid is returned to the reservoir 13.

As described above, in the case where the pressure in the wheel cylinder 51 is under control, if the valve 132b is placed in its closed position, the pressure in the wheel cylinder 52 will be kept in its hold condition. Therefore, the braking force applied to the wheel RL is not affected by the braking force control of the wheel FR, but controlled independently thereof. As a result, when the hold mode is selected for the wheel cylinder 52, for example, in the first hydraulic braking pressure circuit 100, all the modes of rapid increase, gradual increase, hold and decrease may be selected for another wheel cylinder 51. In the case where the pressure in the wheel cylinder 52 is under control, if the rapid increase mode is selected for the wheel cylinder 52, the control mode for the wheel cylinder 51 may be of rapid increase or hold. If the gradual increase mode is selected for the wheel cylinder 52, the control mode for the wheel cylinder 51 may be of gradual increase or hold, and if the decrease mode is selected for the wheel cylinder 52, the control mode for the wheel cylinder 51 may be of decrease or hold.

According to the present embodiment, therefore, the pressures in the wheel cylinders 51, 52 are controlled independently of each other in the first hydraulic braking pressure circuit 100, and the pressure in each wheel cylinder is controlled independently in the second hydraulic braking pressure circuit 200, as well, so that an appropriate braking force control may be made. In addition, since the pressure in each wheel cylinder is controlled by the pressure discharged from the fluid pumps 121, 221, with the wheel cylinder prevented from communicating with the master cylinder 12. Accordingly, a so-called kick-back phenomenon is not caused during the anti-skid operation, nor caused is such a relatively large noise during the pressure control operation as caused in the prior apparatus. The fluid pumps 121, 221 are driven by a single electric motor 23, and so arranged that the brake fluid discharged from them are circulated through the circulation passages 184, 284, respectively, when the valves 133, 233 are placed in the open positions. As a result, each of the fluid pumps 121, 221 is capable of rotating continuously with a relatively small load, comparing with the prior pumps. In the case where the pressure in a certain wheel cylinder is necessitated to be increased by one of the fluid pumps, if the other fluid pump is driven to recirculate the brake fluid as described before, the former one of the pumps can be driven at the relatively small load. Therefore, most of the driving force of the electric motor 23 can be distributed to the fluid pump for increasing the pressure.

FIG. 11 illustrates a second embodiment of the present invention, wherein both the first and second hydraulic braking pressure circuits 100, 200 employ the diagonal dual circuits constituted in the same fashion as in FIG. 4. In the present embodiment, a pair of check valves 143, 144 are disposed in the brach passages 180a, 180b, respectively. Between the wheel cylinders 51, 52 and the brach passages 180a, 180b, respectively, are connected branch passages 183a, 183b which merge into the passage 183, in which the valve 131 is disposed. In the branch passages 183a, 183b, a pair of normally closed two-port two-position electromagnetic valves 132c, 132d (hereinafter, simply referred to as valves 132c, 132d) are disposed, respectively. The check valves 141, 142 are disposed in the return passages 181, 182 between the master cylinder 12 and the position between the check valves 143, 144 and the wheel cylinders 51, 52 (upstream of the check valves 143, 144). Also in the second hydraulic braking pressure circuit 200, the check valves 241, 242, check valves 243, 244 and normally closed two-port two-position electromagnetic valves 232c, 232d are disposed. The check valves 143, 144 are adapted to permit the brake fluid to flow in the direction toward the wheel cylinders 51, 52 and prevent it from flowing in the direction toward the master cylinder 12, so that the master cylinder pressure is supplied to the wheel cylinders 51, 52 through the check valves 143, 144. The check valves 243, 244 are arranged in the same manner as the check valves 143, 144. The rests of the components in the present embodiment are substantially the same as those of the first embodiment, so that the explanation about them is omitted.

According to the second embodiment, in the normal braking operation, all the valves are placed in the positions as shown in FIG. 11, the electric motor 23 has been stopped. When the brake pedal 10 is depressed, the master cylinder pressure is supplied from the first and second pressure chambers 12a, 12b of the master cylinder 12 to the first and second hydraulic braking pressure circuits 100, 200, and fed to the wheel cylinders 51–54 through the check valves 143, 144, 243, 244. In the first hydraulic braking pressure circuit 100, the wheel cylinders 51, 52 are fluidly separated from each other (i.e., no fluid communication therebetween) by the check valves 143, 144. Therefore, even if a pressure difference is caused between the wheel cylinders 51, 52, the pressure difference will be maintained without affecting each other, so that the pressure in each of the wheel cylinders 51, 52 will be controlled independently of each other. Since the second hydraulic braking pressure circuit 200 operates in the same fashion as the first hydraulic braking pressure circuit 100, the operation will be explained only about the first hydraulic braking pressure circuit 100 hereinafter.

When the anti-skid control is initiated, the valve 131 is energized to be placed in its closed position, so that the main hydraulic passage 180 is shut off to separate the master cylinder section from the wheel cylinder section. At the same time, the electric motor 23 is started to operate the fluid pump 121, and the valve 133 is placed in its open position to open the circulation passage 184. In this case, the valves 132c, 132d are placed in the closed positions, respectively, so that the branch passages 183a, 183b are shut off thereby to hold the pressures in the wheel cylinders 51, 52. Therefore, the brake fluid discharged from the fluid pump 121 is circulated through the circulation passage 184 and etc. Then, if it is determined that one of the wheels, e.g. the wheel FR tends to be locked, the control mode for the wheel cylinder 51 is switched from the hold mode to the decrease mode, in which the valve 132c is placed in its open position to open the branch passage 183a. Consequently, the wheel cylinder 51 is communicated with the auxiliary reservoir 122 via the valve 132c and the valve 133, so that the brake fluid in the wheel cylinder 51 is drained into the auxiliary reservoir 122 thereby to decrease the pressure in the wheel cylinder 51. When the gradual increase mode is selected, the valve 133 is placed in its closed position to shut off the circulation passage 184, the brake fluid in the auxiliary reservoir 122 is supplied by the fluid pump 121 to the wheel cylinder 51 through the valve 132c placed in its open position, thereby to gradually increase the pressure in the wheel cylinder 51. According to the second embodiment, not only the valves 133, 233 are of the normally closed type as in the first embodiment, but also the valves 132c, 132d, 232c, 232d are of the normally closed type. Therefore, the precision required for obtaining a necessary sealing property is not so high that further decrease in cost is expected.

Figure 12:
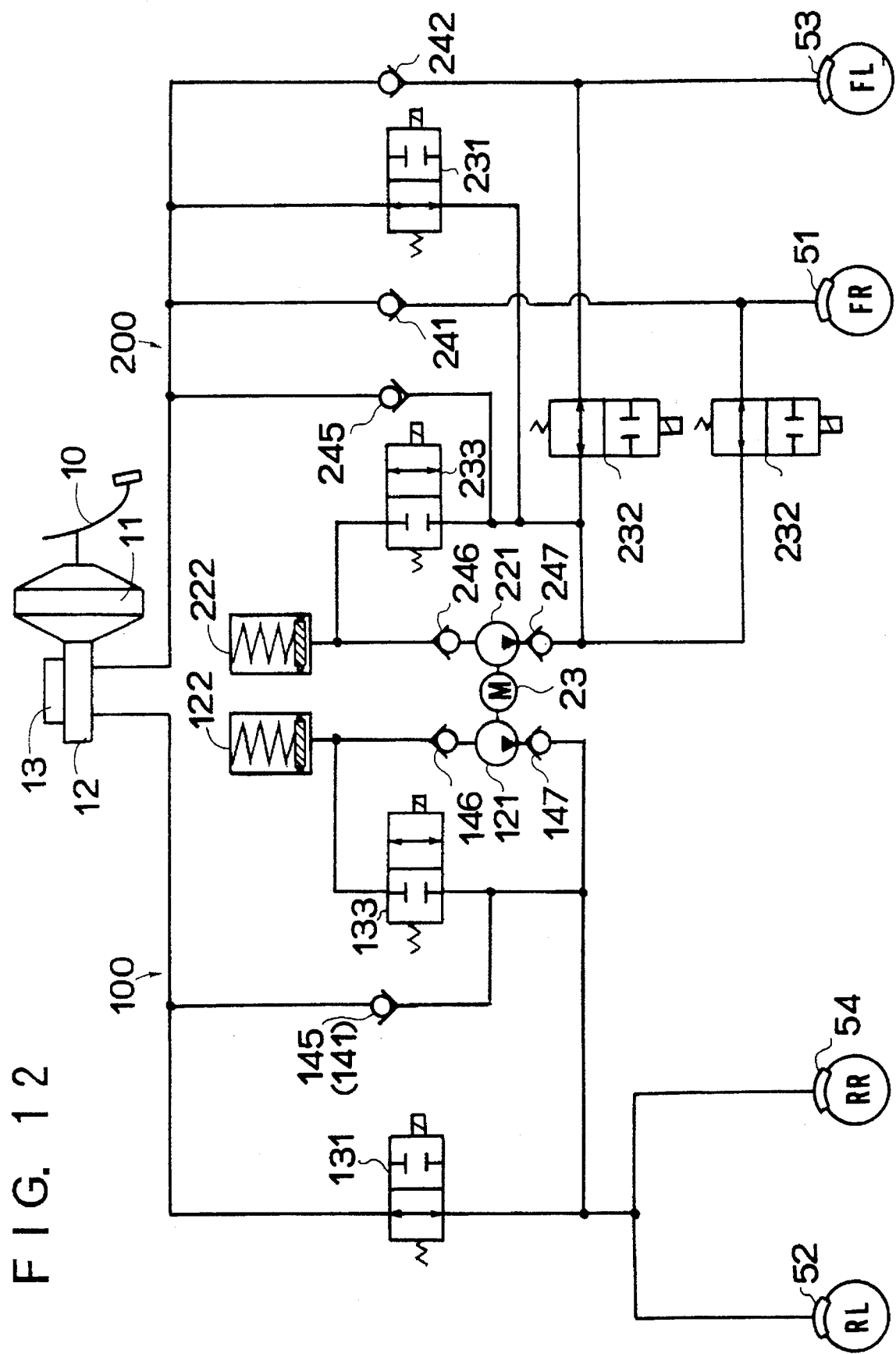
FIG. 12 is a schematic block diagram of a hydraulic braking system according to a third embodiment of the present invention.
Figure 13:
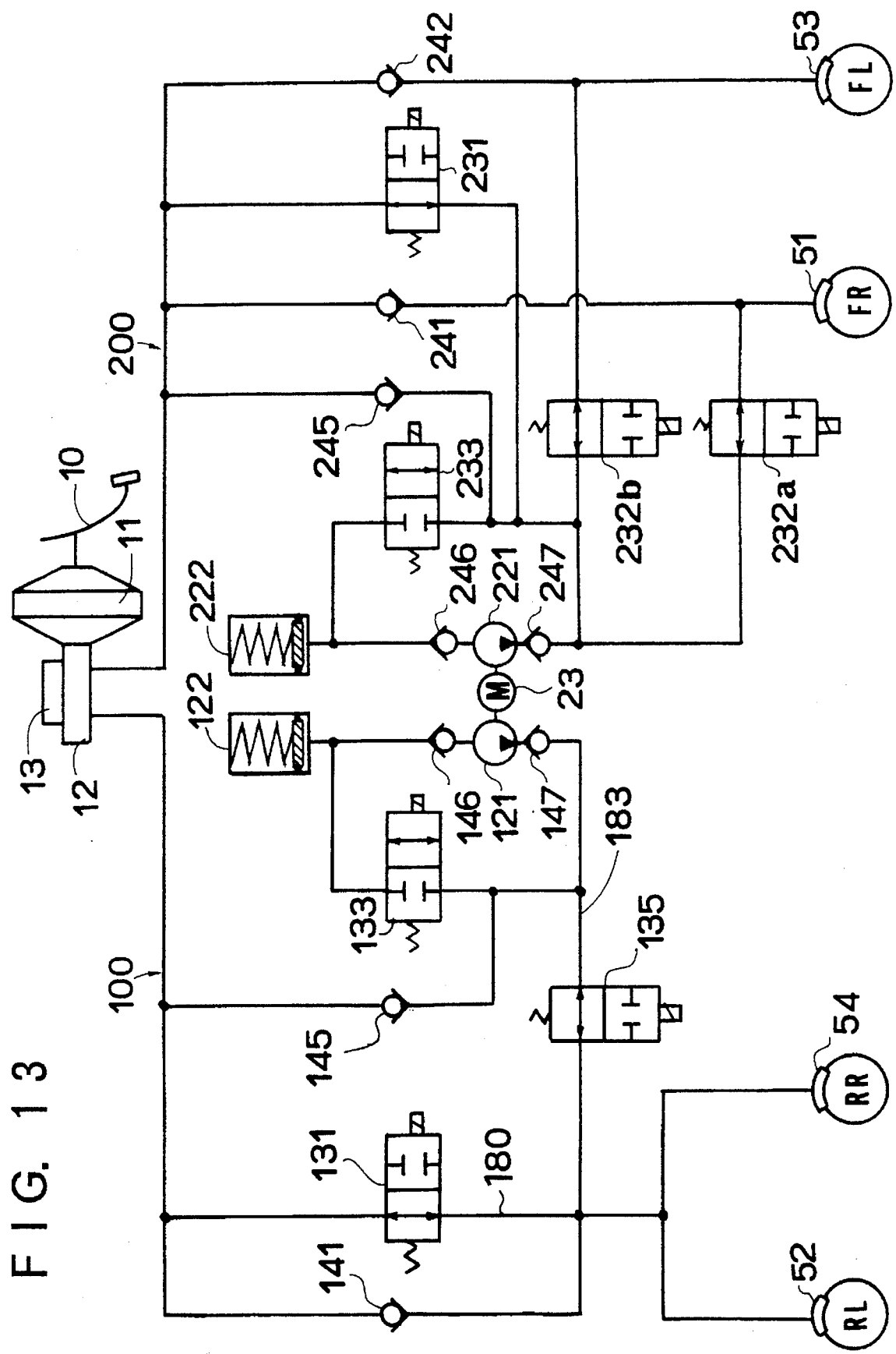
FIG. 13 is a schematic block diagram of a hydraulic braking system according to a fourth embodiment of the present invent ion.

FIGS. 12 and 13 illustrate the hydraulic braking systems of the front and rear dual circuits according to the third and fourth embodiments. In either embodiment, the wheel cylinder 51, 53 operatively mounted on the front wheels FR, FL are included in the second hydraulic braking pressure circuit 200 as in the first embodiment in FIG. 10, while the first hydraulic braking pressure circuit 100 is arranged to control the pressures in the wheel cylinders 52, 54 of the rear wheels RL, RR simultaneously.

According to the third embodiment in FIG. 12, the first hydraulic braking pressure circuit 100 provided at the rear side of the vehicle includes the same auxiliary pressure source (the fluid pump 121 and etc.) as that provided at the front side, and the valve 131 for the first valve according to the present invention, while it does not include the second valve according to the present invention. Furthermore, it does not have the check valves 141, 142, because the check valve 145 acts as those check valves. According to the present embodiment, therefore, in the normal braking operation as shown in FIG. 12, the brake fluid is supplied from the master cylinder 12 to the wheel cylinders 52, 54 at the rear side through the valve 131 placed in its open position. When the anti-skid operation is initiated, the valve 131 is placed in its closed position, and the electric motor 23 is driven. Then, with the valve 133 controlled to be opened or closed, the pressures in the wheel cylinders 52, 54 are gradually increased or decreased, simultaneously. Therefore, the number of electromagnetic valves is reduced to minimize it in this embodiment, although the hold mode can not be selected at the rear side, but only three modes of rapid increase, gradual increase and decrease can be selected.

Whereas, in the fourth embodiment as shown in FIG. 13, in addition to the arrangement as shown in FIG. 12, a single check valve 141 is provided for returning the brake fluid to the reservoir 13 from the wheel cylinders 52, 54, and a normally open two-port two-position electromagnetic valve 135 (hereinafter, referred to as valve 135) is disposed in the passage 183, which connects the fluid pump 121 to a position between the valve 131 and the wheel cylinders 52, 54. According to the fourth embodiment in FIG. 13, therefore, when the anti-skid operation is initiated, the valve 131 is placed in its closed position and the electric motor 23 is driven, but the pressures in the wheel cylinders 52, 54 are held simultaneously. Then, after the valve 135 is placed in its open position, the valve 133 are controlled to be opened or closed to gradually increase or decrease the pressures in the wheel cylinders 52, 54. According to the present embodiment, although one electromagnetic valve and one check valve are to be added to the embodiment as shown in FIG. 12, the gradual increase mode, decrease mode and hold mode can be selected for the wheel cylinders 52, 54 at the rear side. Furthermore, the present embodiment provides a simultaneous control mode for the rear wheels, with only one check valve 141 disposed in stead of the check valves 141, 142 disposed in the preceding embodiments, and with the valve 135 disposed in stead of the valves 132a, 132b. As a result, the number of electromagnetic valves and that of check valves have been reduced by one, respectively, comparing with the embodiment as shown in FIG. 10.

Figure 14:
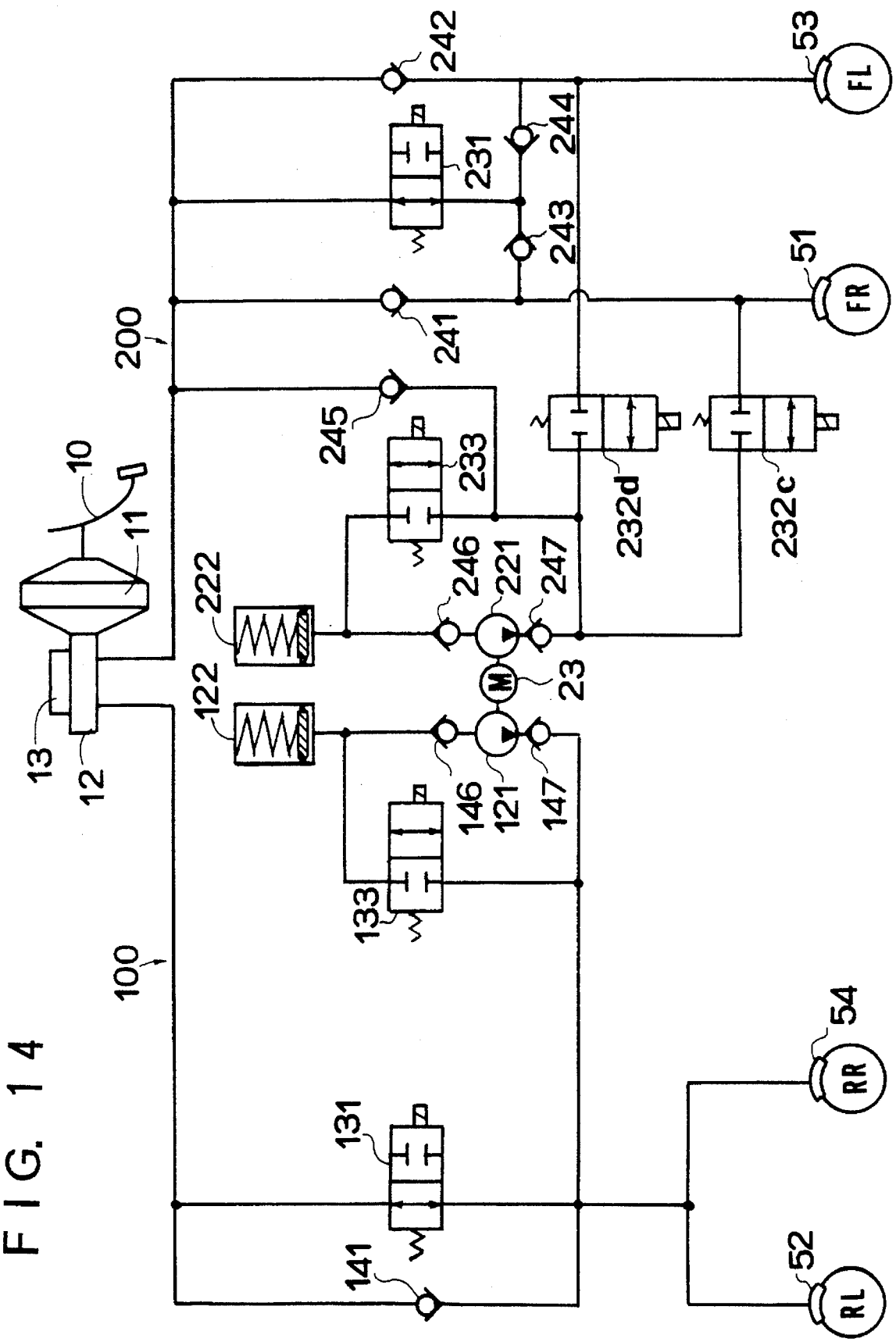
FIG. 14 is a schematic block diagram of a hydraulic braking system according to a fifth embodiment of the present invention.
Figure 15:
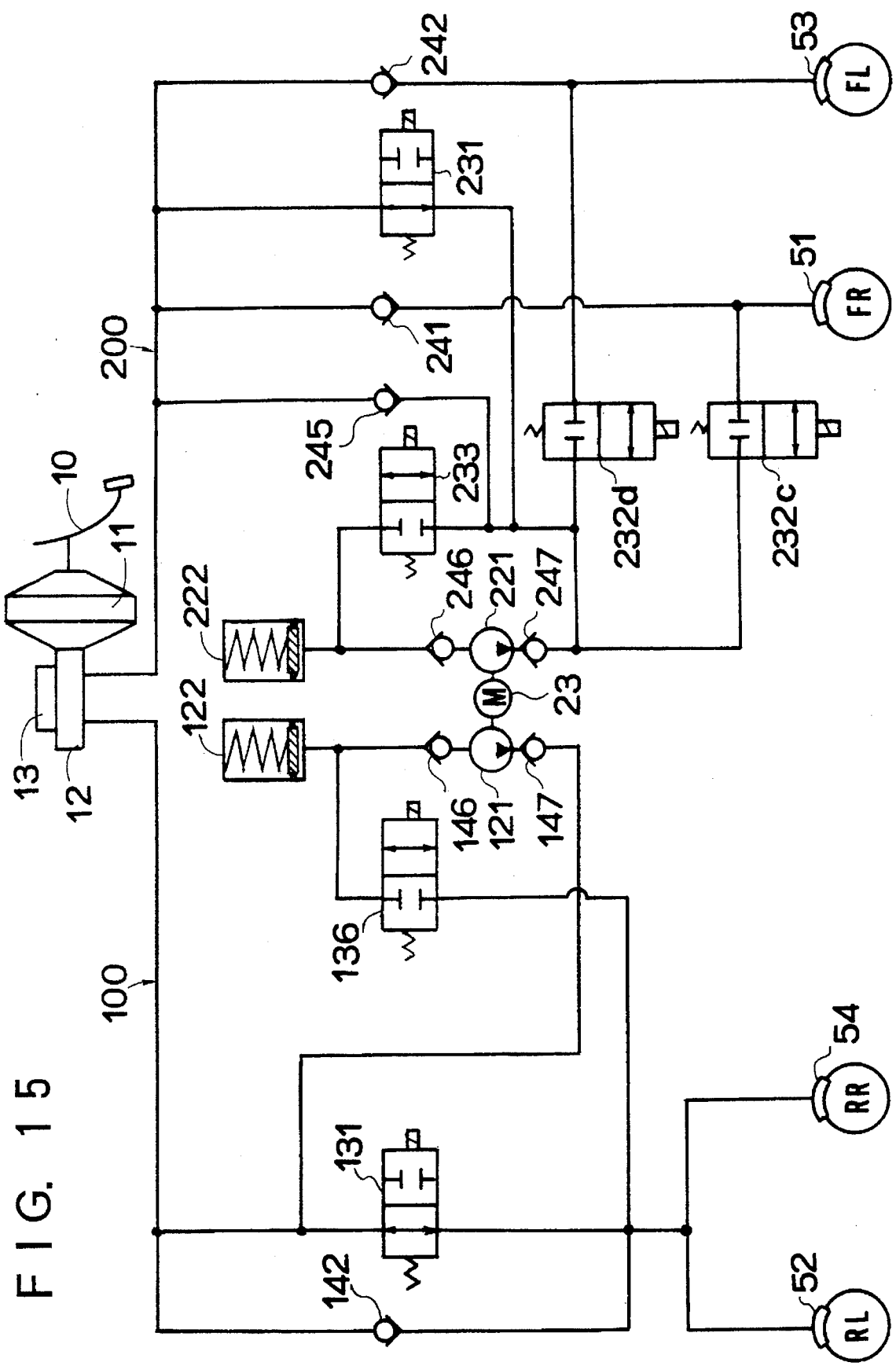
FIG. 15 is a schematic block diagram of a hydraulic braking system according to a sixth embodiment of the present invention.

FIGS. 14 and 15 illustrate the hydraulic braking systems of the front and rear dual circuits according to the fifth and sixth embodiments. In either embodiment, the wheel cylinders 51, 53 operatively mounted on the front wheels FR, FL are included in the second hydraulic braking pressure circuit 200 as in the second embodiment in FIG. 11, while the first hydraulic braking pressure circuit 100 is arranged to control the pressures in the wheel cylinders 52, 54 of the rear wheels RL, RR simultaneously. The first hydraulic braking pressure circuit 100 at the rear side according to the fifth embodiment in FIG. 14 is substantially the same as that of the third embodiment in FIG. 12 (the check valve 141 in FIG. 14 has the same function as the check valve 145 in FIG. 12), so that the number of electromagnetic valves is minimized in this embodiment.

The first hydraulic braking pressure circuit 100 at the rear side of the vehicle according to the sixth embodiment in FIG. 15 is constituted in the same manner as the system for controlling the braking force applied to the rear wheels simultaneously in the prior apparatus. In this embodiment, a normally closed two-port two-position electromagnetic valve 136 does not correspond to the valve 131 in the aforementioned embodiments, and the fluid pump 121 and the auxiliary reservoir 122 operate in different manners from those in the aforementioned embodiments. Therefore, as far as the rear wheel side of the vehicle is concerned in this embodiment, the communication with the master cylinder 12 is not shut off, so that the brake fluid is returned to the master cylinder 12 even in the anti-skid control operation. However, the pressure variation caused in the master cylinder 12 can be reduced by that caused at the front side of the vehicle wherein the pressure control is made in accordance with the present invention, comparing with the prior apparatus.

FIG. 16 illustrates the seventh embodiment in which the first and second hydraulic braking pressure circuits 100, 200 are constituted in the same manner as those in FIG. 5, and illustrates the embodiment applied to a FF (front-engine, front-drive) vehicle, with a traction control mode added to the first embodiment employing the diagonal dual circuits as shown in FIG. 10. That is, the wheels FR, FL are driven wheels and the wheels RR, RL are non-driven wheels in the present embodiment. In addition to the first embodiment in FIG. 10, three-port two-position electromagnetic valves 134, 234 (hereinafter, simply referred to valves 134, 234) and the check valves 148, 248 are provided, and relief valves 149, 249 are provided in lieu of the check valves 145, 245. The first and second hydraulic braking pressure circuits 100, 200 as shown in FIG. 16 are the same, so that only the former will be explained hereinafter.

The valve 134 in FIG. 16 is disposed between the first pressure chamber 12a of the master cylinder 12 and the check valves 141, 142. That is, its first port is connected to the master cylinder 12, and its second port is connected to the return passages 181, 182. Its third port is connected to a position between the check valves 146, 148 at the inlet side of the fluid pump 121. In other words, the check valve 148 is disposed between the check valve 146 and the position between the circulation passage 184 and the auxiliary reservoir 122. The valve 134 is selectively placed in one of a first position and a second position. Normally (i.e. when it is not energized), the valve 134 is placed in the first position, where the check valves 141, 142 (and return passages 181, 182) are communicated with the first pressure chamber 12a of the master cylinder 120 and where their communication with the inlet of the fluid pump 121 is blocked. On the contrary, when the valve 134 is energized, it is placed in the second position, where the communication between the check valves 141, 142 and the master cylinder 12 is blocked to shut off the return passages 181, 182, and where the inlet of the fluid pump 121 is communicated with the master cylinder 12 (and then, with the reservoir 13), so that the brake fluid in the reservoir 13, can be introduced into the fluid pump 121. The relief valve 149 is adapted to return the brake fluid discharged from the fluid pump 121 to the reservoir 13 through the master cylinder 12 when the pressure of the discharged brake fluid exceeds a predetermined pressure, thereby to regulate the pressure of the discharged brake fluid into the predetermined pressure. The check valve 142 at the driven wheel side may be communicated directly with the first pressure chamber 12a of the master cylinder 12 without communicating with the valve 134.

According to the embodiment in FIG. 16, the valve 134 is placed in the first position, during the normal driving and braking operations, so that the braking system operates in the same manner as described in FIG. 10. In the case where the vehicle is rapidly accelerated for example, so that the traction control mode is selected to prevent the driven wheels from slipping (therefore, the brake pedal 10 is not depressed), the valve 134 is placed in the second position, and the valve 131 is placed in the closed position. Also, the valve 132b connected to the wheel cylinder 52 for the non-driven wheel RL is placed in the closed position, while the valve 132a for the driven wheel is maintained to be in the open position. Then, when the fluid pump 121 is driven by the electric motor 23, the brake fluid is sucked from the reservoir 13 through the master cylinder 12 which is not actuated, and discharged to the wheel cylinder 51 for the driven wheel FR. In this case, the pressure of the brake fluid discharged from the fluid pump 121 is limited to the predetermined pressure by the relief valve 149, and the brake fluid discharged more than the amount limited by the relief valve 149 is returned to the reservoir 13 through the master cylinder 12. Whereby, the wheel FR is braked to limit the rotational force applied thereto, thereby to prevent its acceleration slip. In this condition, when the valve 133 is placed in the open position, the brake fluid in the wheel cylinder 51 is returned to the auxiliary reservoir 122 through the valve 133 thereby to decrease the pressure in the wheel cylinder 51. During this operation, the fluid pump 121 is maintained to be driven at a relatively low speed, and the discharged brake fluid is circulated through the circulation passage 184, so that the load applied to the electric motor 23 is relatively small. Thereafter, when the valve 132a is placed in the closed position, the pressure in the wheel cylinder 51 is held.

Accordingly, in the case where the brake pedal 10 is not depressed, if the acceleration slip is caused on the wheel FR for example, any mode of the gradual increase, decrease and hold modes may be selected for the wheel cylinder 51 to perform the traction control operation appropriately. When the brake pedal 10 is depressed during the traction control operation, or when both the brake pedal 10 and an acceleration pedal (not shown) are depressed, the master cylinder pressure is discharged. Consequently, if the brake fluid is introduced from the master cylinder 12 to the auxiliary reservoir 122 through the valve 134 (placed in the second position), the auxiliary reservoir 122 will be filled up with the brake fluid, so that it will become impossible to start the anti-skid control operation immediately. In order to prevent the auxiliary reservoir 122 from being filled up with the brake fluid, the check valve 148 is provided in the present embodiment for limiting the flow of the brake fluid from the master cylinder 12 (and the reservoir 13) to the auxiliary reservoir 122, whereby such a case may be avoided that the brake fluid is supplied from the reservoir 13 extraordinarily to fill up the auxiliary reservoir 122.

FIG. 17 illustrates the eighth embodiment which is constituted in the same manner as in FIG. 6, and which is provided with the valves 134, 234 as in FIG. 16, with the traction control mode added to the second embodiment as shown in FIG. 11. The explanation of constitution and function in this embodiment will be omitted, since this embodiment is a combination of such embodiments as disclosed in FIGS. 11 and 16.

FIGS. 18 and 19 illustrate respectively the ninth and tenth embodiments, either of which is applied to a FR (front-engine, rear-drive) vehicle, and which employs the front and rear dual circuits. According to these embodiments, not only the anti-skid control mode but also the traction control mode may be selected, and the valve 134 which is provided for the traction control mode, is arranged only in the circuit including the driven wheels RR, RL. Comparing with the embodiments in FIGS. 16, 17, the relationship between the wheel cylinders 51–54 and the first and second hydraulic braking pressure circuits 100, 200 in FIGS. 18, 19 is different from that in FIGS. 16, 17, and the valve 234 and the relief valve 249 in FIGS. 16, 17 are omitted in FIGS. 18, 19. The operation in the first hydraulic braking pressure circuit 100 for the driven wheels is performed in the same manner as that of the circuit for the driven wheels in FIG. 16, as described before.

FIG. 20 illustrates the eleventh embodiment which is capable of maintaining a stability of a vehicle by controlling a braking force distribution to each wheel, and which includes check valves 161, 261 having the same function as that of the check valve 61 in FIG. 7, and includes orifices 162, 262 disposed in the downstream of the check valves 161, 261, in the hydraulic braking pressure circuit for the front wheels FR, FL as shown in FIG. 16. The arrangement of the wheels in each hydraulic braking pressure circuit in FIG. 20 is reverse to that in FIG. 16, but the former is included in the embodiment in FIG. 16, wherein the wheels FR, RL (or, the wheels FL, RR) can be exchanged with each other in each hydraulic braking pressure circuit.

According to the eleventh embodiment as shown in FIG. 20, when the stability control is initiated in the first hydraulic braking pressure circuit 100, the valve 134 is switched to the second position, and the valve 131 is placed in the closed position. At the same time, the electric motor 23 is driven to discharge the brake fluid from the fluid pump 121. With the valve 133 and the valves 132a, 132b opened or closed properly, the pressure in each of the wheel cylinders 51, 52 is gradually increased, decreased or held so as to control the braking force distribution between the front wheel FR and the rear wheel RL. During this control, if the brake pedal 10 is depressed, the brake fluid is discharged from the master cylinder 12 to the wheel cylinder 51, via the valve 134, the check valve 161 and the orifice 162. Whereby, the braking force is applied to the front wheel FR in response to a depression of the brake pedal 10. The orifice 162 is provided for adjusting the braking force, but it may be omitted. The hydraulic braking pressure circuit for the rear wheel RL may be provided with the check valve 161 to be constituted in the same fashion as that for the front wheel FR.

According to the seventh embodiment as shown in FIG. 16, in the case where the braking pressure control is being made without the brake pedal 10 depressed when the acceleration slip tends to be caused, if the brake pedal 10 is depressed, the traction control will be terminated immediately, so that the valves 134, 234 will be returned to the first position thereby to communicate the master cylinder 12 with the wheel cylinders 51–54. However, in the case where the braking force distribution to each wheel is being controlled for the stability control when the vehicle is running, even if the brake pedal 10 is depressed, sometimes the master cylinder 12 may not be communicated directly with each wheel cylinder, i.e. a direct braking mode may not be selected, immediately after the brake pedal 10 is depressed. Therefore, a pressure sensor or the like for detecting the operation of the brake pedal 10 has been provided in the prior system, but it results in increase in cost. Whereas, according to the eleventh embodiment as shown in FIG. 20, only if the check valve 161 (and, the orifice 162, if necessary) is provided in addition, the braking system may be adapted to operate immediately after the brake pedal 10 is depressed.

FIG. 21 illustrates the twelfth embodiment, which includes the check valves 161, 261 and the orifices 162, 262 in the hydraulic braking pressure circuit for the front wheels FR, FL of the eighth embodiment (front-engine, front-drive) as shown in FIG. 17. According to this embodiment, therefore, if the brake pedal 10 is depressed during the pressure control, the braking force can be applied to the wheel under control thereby to control the stability of the vehicle appropriately.

FIG. 22 illustrates the thirteenth embodiment, in which the vehicle stability control mode may be selected. According to the present embodiment, the valves 131a, 131b, 231a, 231b are provided for shutting off the communication between the master cylinder 12 and the wheel cylinders 51–54, respectively. This embodiment includes the electromagnetic valves more than those included in the embodiment as shown in FIG. 21 by two valves, but includes the check valves 141, 142 and the check valves 241, 242 less than those included in FIG. 21 wherein the check valves 141–144 and the check valves 241–244 are arranged in a different fashion from the check valves included in this embodiment. That is, it is so arranged in this embodiment that the communication with the master cylinder 12 can be shut off, with respect to only one wheel cylinder in a single hydraulic braking pressure circuit.

During the vehicle stability control operation, if it is required to prevent a spin of the vehicle, for example, it is necessary to produce an anti-spin moment. In this case, therefore, the braking force shall be applied to only one wheel. However, in the case where the wheel cylinders of every wheels have been shut off from the master cylinder 12, even if it becomes necessary to apply the braking force to the wheels with the brake pedal 10 depressed, during the vehicle stability control, no hydraulic braking pressure would be supplied to the wheel cylinders. Therefore, it is necessary to detect the operation of the brake pedal 10 by a pressure sensor for example, so as to communicate the wheel cylinders with the master cylinder 12. According to the thirteenth embodiment as shown in FIG. 22, however, only the electromagnetic valve necessary for controlling the vehicle stability (e.g. valve 131a) is placed in the closed position, while other electromagnetic valves (e.g. 131b, 231a, 231b) may be placed in the open positions. Therefore, when the brake pedal 10 is depressed, the brake fluid is supplied to each wheel cylinder through the electromagnetic valve placed in the open position. Accordingly, no expensive pressure sensor will be required in the present embodiment to solve the above-described problem.

Figure 23:
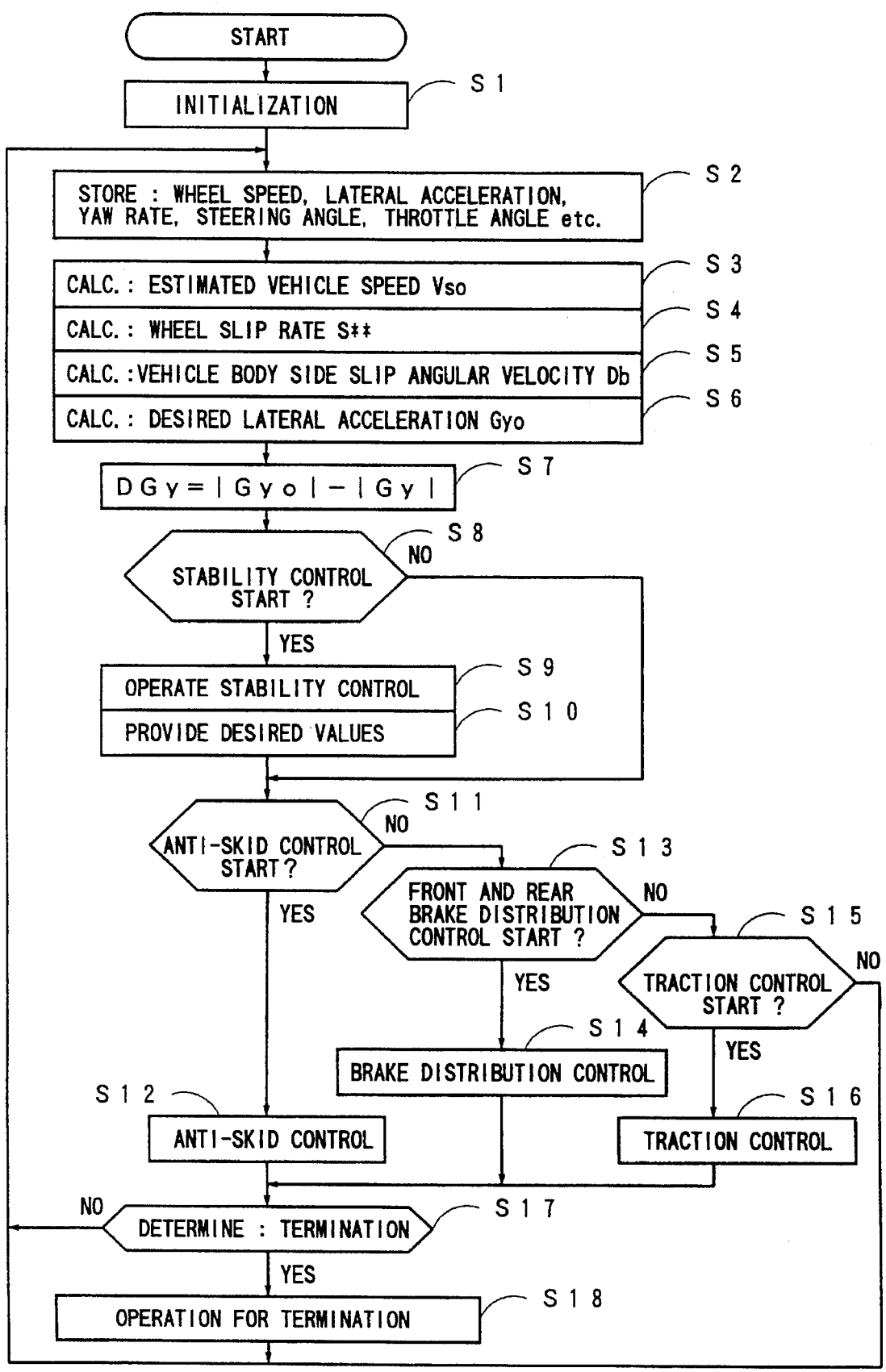
FIG. 23 is a flowchart showing the braking force control according to an embodiment of the present invention.

The program executed by the electronic controller 300 as shown in FIG. 9 will now be described with reference to FIGS. 23 and 24. Referring to FIG. 23, at the outset, the program provides for initialization of the system at Step S1, whereby various data are cleared. Then, at Step S2, the wheel speed Vw ( represents the wheel FL, FR, RL, RR) detected by the wheel speed sensors 351–354 are stored in the microcomputer 301, and also the steering angle Af detected by the front steering sensor 361, the yaw rate Yr detected by the yaw rate sensor 362 and the actual lateral acceleration Gy detected by the lateral acceleration sensor 363 are stored.

The program proceeds to Step S3, where a vehicle speed is estimated on the basis of each wheel speed Vw to obtain an estimated vehicle speed Vso. And, at Step S4, on the basis of the wheel speed Vw of each wheel and the estimated vehicle speed Vso at Step S2 and Step S3 respectively, a wheel slip rate S** of each wheel is calculated in accordance with the following formula:

$$S^{}=(Vso-Vw^{})/Vso$$

Then, at Step S5, the vehicle body side slip angular velocity Db is calculated from Db=Gy/Vso−Yr. On the basis of the steering angle Af detected by the steering angle sensor 361 and the estimated vehicle speed Vso calculated at Step S3, a desired lateral acceleration Gyo is calculated at Step S6 in accordance with the following formula:

$$Gyo=(Vso^2 \times Af/N)/(1+F \times Vso^2) \times L$$

where "N" represents a steering gear ratio, "F" represents a stability factor, "L" represents a wheel base length and "x" indicates multiplication. Thereafter, a deviation DGy is calculated at Step S7 by subtracting the desired lateral acceleration Gyo from the actual lateral acceleration Gy detected by the lateral acceleration sensor 363.

Then, the program proceeds to Step S8, where it is determined if the vehicle stability control mode is to be selected. If the conditions for starting the vehicle stability control mode are fulfilled, the program proceeds to Step S9 where the operation for the vehicle stability control is made, so that the operation for controlling a braking force applied to each wheel in accordance with a driving condition of the vehicle. According to the present embodiment, the vehicle stability control will be superimposed on the controls followed thereafter which will be described later. In other words, at Step S10, the desired values provided for the anti-skid control mode, front and rear braking force distribution control mode and the traction control mode will be modified. In practice, a desired wheel slip rate for each wheel is provided for producing an anti-spin moment or an anti-drift moment on the basis of the result at Step S9. Thereafter, the program proceeds to Step S11 where it is determined if the conditions for starting the anti-skid control mode are fulfilled. If the result is affirmative, the program proceeds to Step S12 where the anti-skid control mode will start.

If it is determined at Step S11 that the conditions for starting the anti-skid control mode have not been fulfilled, the program proceeds to Step S13 where it is determined if the conditions for starting the front and rear braking force distribution control mode are fulfilled. If the result is affirmative, the program proceeds to Step S14 where the front and rear braking force distribution control mode will start. Otherwise, the program proceeds to Step S15 where it is determined if the conditions for starting the traction control mode are fulfilled, and if so, the program proceeds to Step S16 where the traction control mode will start. Otherwise, the program returns to Step S2. After each control mode is executed at Step S12, Step S14 and Step S16, the program proceeds to Step S17 where the termination of the program is determined. For example, it is determined if the operation for each mode has been made with respect to all the wheels FL, FR, RL, RR, and the above-described routine is repeated until each operation is finished with respect to all the wheels. Then, after a necessary operation specifically provided for the termination is executed at Step S18, the program returns to Step S2. At the steps of Step S9, Step S12, Step S14 and Step S16, the sub-throttle opening angle for the throttle control device 402 may be adjusted in accordance with the driving condition of the vehicle, so that the output of the engine 401 will be reduced to limit the driving force produced thereby.

Figure 24:
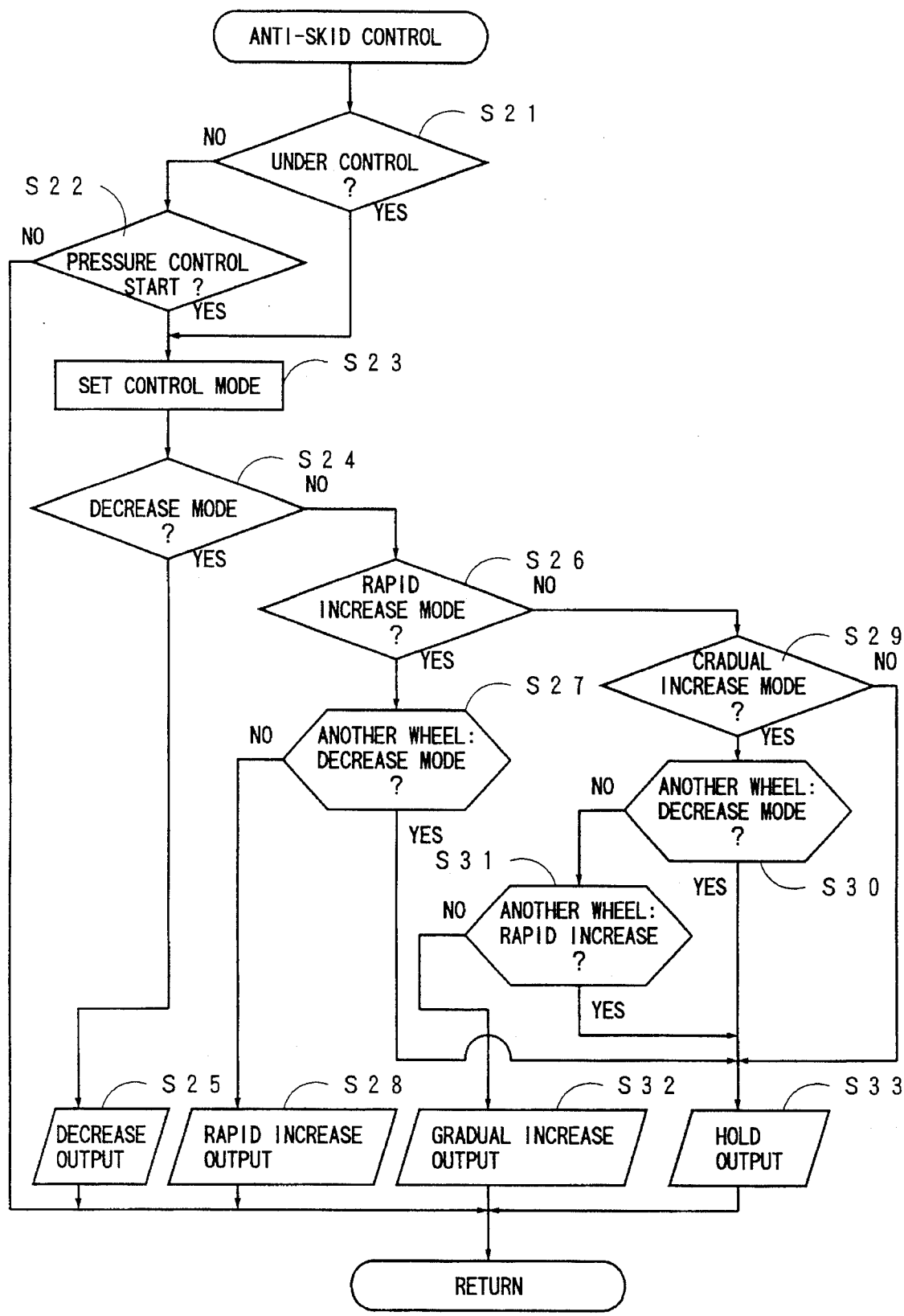
FIG. 24 is a flowchart showing the braking pressure control according to an embodiment of the present invention.
Figure 25:
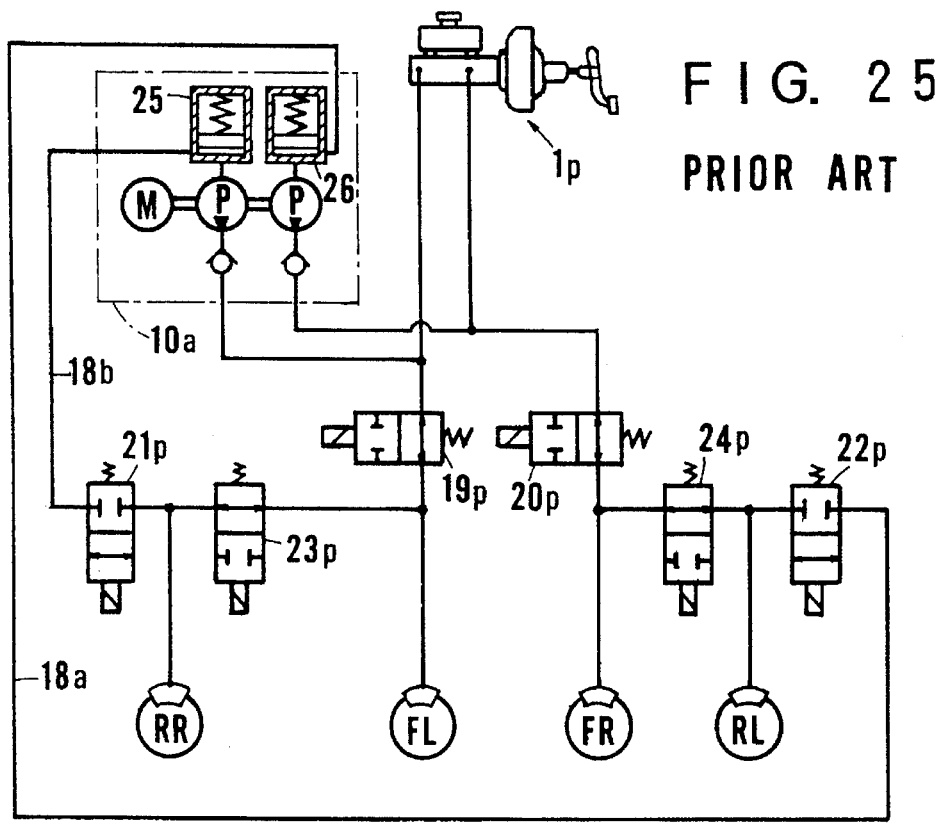
FIG. 25 is a schematic block diagram of a hydraulic braking system shown in a prior publication.
Figure 26:
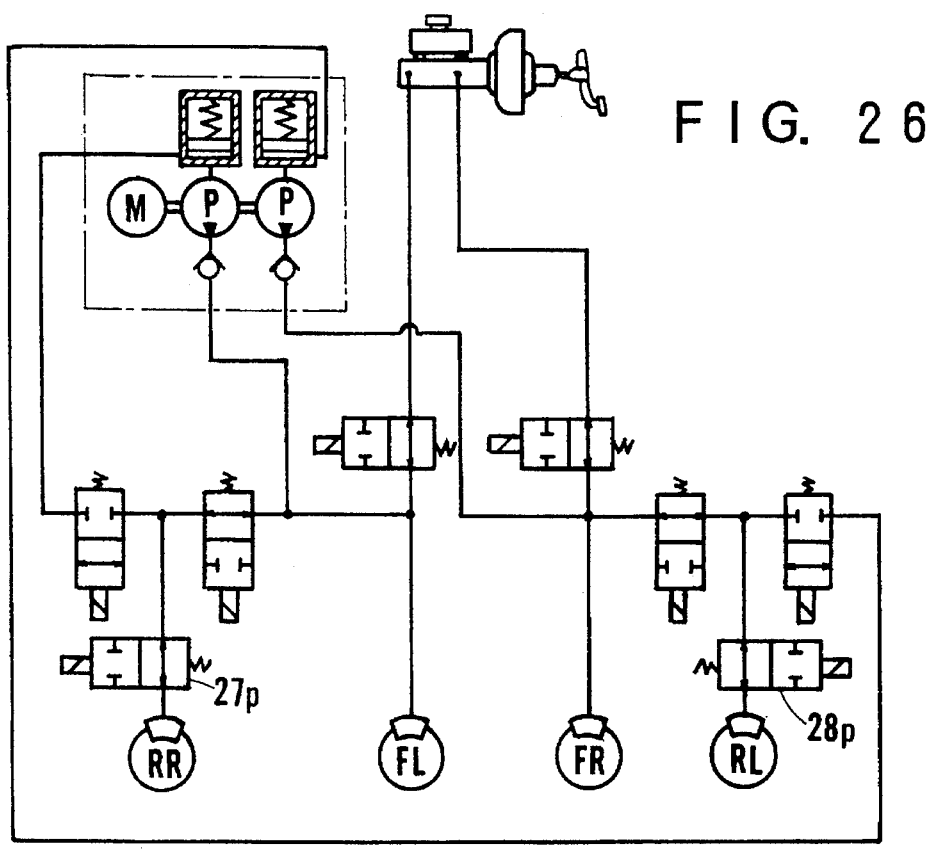
FIG. 26 is a schematic block diagram of the system in FIG. 25 modified in part by the present inventors.
Figure 27:
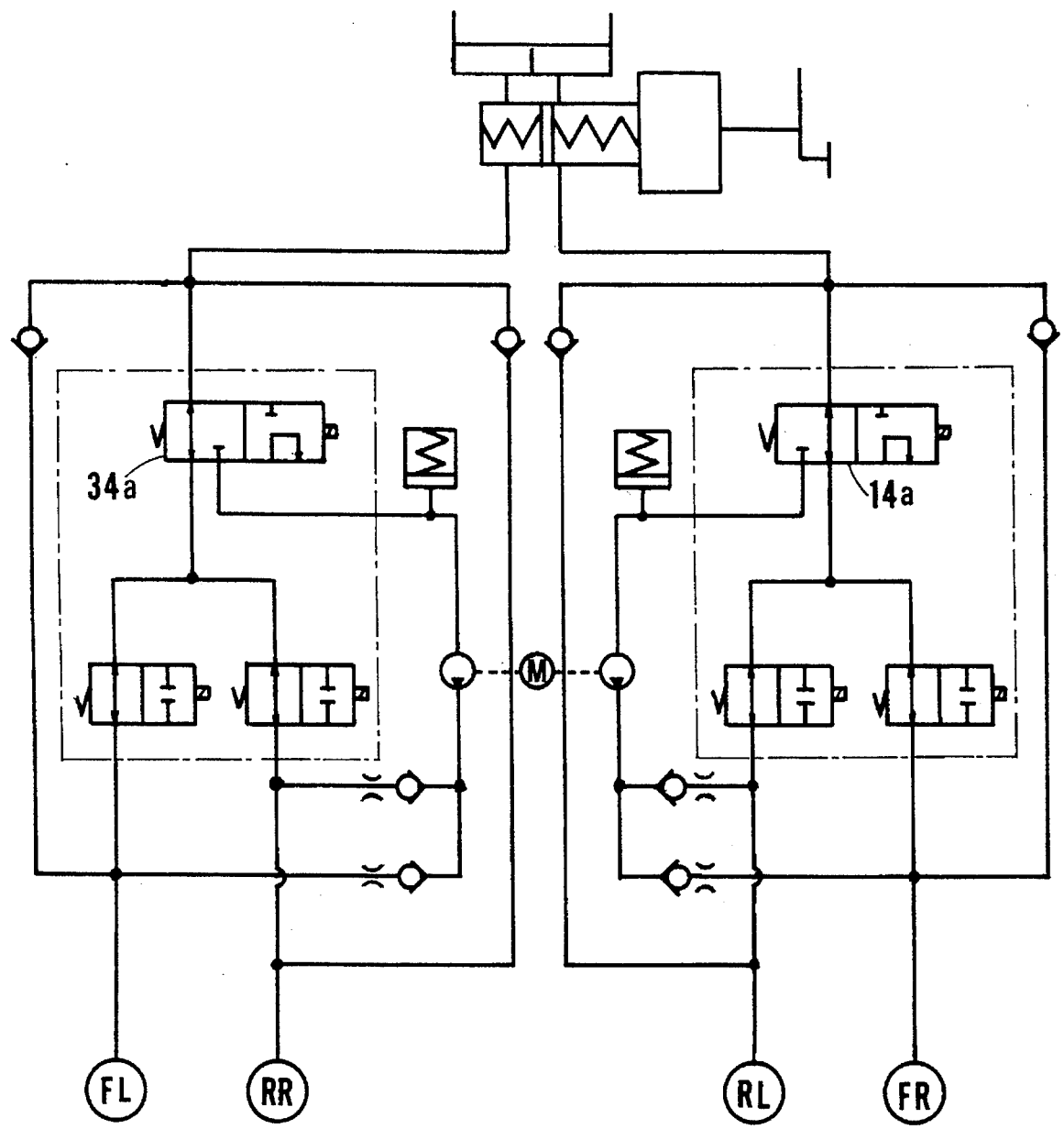
FIG. 27 is a schematic block diagram illustrating a hydraulic braking circuit disclosed in a co-pending patent application filed by one of the present inventors.

FIG. 24 shows a subroutine of Step S12 in FIG. 23 for the anti-skid control mode. At Step S21, it is determined if the anti-skid control mode is being executed, or under control, with respect to one of the two wheels in a hydraulic braking pressure circuit. If it is under control, the program proceeds to Step S23, otherwise it proceeds to Step S22, where it is determined if the conditions for starting the anti-skid control mode are fulfilled with respect to the one wheel as described above, and if so, the program proceeds to Step S23. If the conditions for starting the anti-skid control mode have not been fulfilled, the program returns to the main routine in FIG. 23. At Step S23, one of the decrease mode, the rapid increase mode, the gradual increase (or, pulse increase) mode and the hold mode is selected in accordance with the braking condition which is determined on the basis of the wheel speed Vw, the estimated vehicle speed Vso, the wheel slip rate S or the like, and the coefficient of friction (CF) of the road surface. At Step S24, it is determined if the control mode is the decrease mode, if it is the decrease mode, then the program proceeds to Step S25 where the decrease mode signal is output, otherwise, the program proceeds to Step S26 where it is determined if the control mode is the rapid increase mode. If it is determined to be in the rapid increase mode, the program proceeds to Step S27, where it is determined if another wheel of the two wheels as described above is in the decrease mode. Thus, only in the case where another wheel is not in the decrease mode, the program proceeds to Step S28 where the rapid increase mode signal is output. When another wheel is in the decrease mode, the program proceeds to Step S33 where the hold mode is selected for the above-described one wheel. If it is determined at Step S26 that the control mode is not the rapid increase mode, the program proceeds to Step S29 where the gradual increase mode has been selected. If the result is affirmative, the program proceeds to Step S30 and Step S31, it is determined that another wheel as described above is in the decrease mode or in the rapid increase mode. Only in the case where another wheel is not in the decrease mode, nor in the rapid increase mode, the program proceeds to Step S32, where the gradual increase mode signal is output to gradually increase the pressure in the wheel cylinder under control. In the case where another wheel is in the decrease mode or in the rapid increase mode, the program proceeds to Step S33 where the hold mode is selected for the above-described one wheel. If it is determined at Step S29 that the control mode is not the gradual increase mode, the program proceeds to Step S33 where the hold mode signal is output to hold the pressure in the wheel cylinder under control. The selection of the control mode and the output of the increase or decrease signal are made in the same manner as described above, with respect to the wheel cylinder of another wheel.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system having a hydraulic braking pressure circuit for braking each wheel of an automotive vehicle with brake fluid fed to a wheel cylinder operatively mounted on said wheel, comprising:

an auxiliary pressure source having an inlet for introducing the brake fluid and an outlet connected to said hydraulic braking pressure circuit for discharging thereinto the pressurized brake fluid;

a circulation passage disposed between the outlet of said auxiliary pressure source and the inlet thereof for communicating each other;

auxiliary valve means disposed in said circulation passage for opening or closing said circulation passage;

an auxiliary reservoir connected to said circulation passage between said auxiliary valve means and the inlet of said auxiliary pressure source, said auxiliary reservoir having a capacity for storing a predetermined amount of brake fluid, and control means for driving said auxiliary pressure source and actuating said auxiliary valve means to open or close said circulation passage, the brake fluid discharged from said auxiliary pressure source being fed into said hydraulic braking pressure circuit when said auxiliary valve means closes said circulation passage, and the brake fluid discharged from said auxiliary pressure source being circulated in said circulation passage via said auxiliary valve means when said auxiliary valve means opens said circulation passage.

2. A hydraulic braking system as claimed in claim 1, wherein said auxiliary pressure source comprises an electric motor and a fluid pump driven by said electric motor for introducing the brake fluid from said auxiliary reservoir into said fluid pump through the inlet thereof and discharging the pressurized brake fluid from the outlet of said fluid pump.

3. A hydraulic braking system as claimed in claim 2, further comprising a pair of check valves disposed at the inlet side and the outlet side of said fluid pump, respectively, for limiting the flow of brake fluid in the predetermined direction for circulating the brake fluid.

4. A hydraulic braking system as claimed in claim 1, wherein said auxiliary valve means comprises a normally closed two-port two-position electromagnetic valve.

5. A hydraulic braking system as claimed in claim 1, wherein said hydraulic braking pressure circuit comprises;

a plurality of wheel cylinders operatively mounted on the wheels of said automotive vehicle, respectively;

a reservoir for storing the brake fluid; and a master cylinder for introducing the brake fluid from said reservoir and generating a master cylinder pressure in response to a depression of a brake pedal, and wherein said hydraulic braking system further comprises:

first valve means disposed between said master cylinder and at least one wheel cylinder of said wheel cylinders for opening or closing the communication therebetween, said first valve means providing downstream thereof a closed circuit between said wheel cylinder and said first valve means;

a discharge passage for connecting the outlet of said auxiliary pressure source to said closed circuit; and second valve means disposed in said discharge passage for opening or closing said discharge passage.

6. A hydraulic braking system as claimed in claim 5, wherein said first valve means comprises a normally open two-port two-position electromagnetic valve, and wherein said second valve means comprises a normally closed two-port two-position electromagnetic valve.

7. A hydraulic braking system as claimed in claim 6, further comprising a return passage for connecting the outlet of said auxiliary pressure source to a position between said master cylinder and said first valve means, and a check valve disposed in said return passage for permitting the brake fluid to flow in the direction toward said master cylinder and preventing the brake fluid from flowing in the reverse direction.

8. A hydraulic braking system as claimed in claim 5, wherein said hydraulic braking pressure circuit is divided into two circuits, each circuit having said first valve means, and at least one circuit having said second valve means, and wherein a pair of auxiliary pressure sources having the same structure as said auxiliary pressure source are connected to said two circuits through said discharge passage, respectively, both of said auxiliary pressure sources driven by a single driving source.

9. A hydraulic braking system as claimed in claim 8, wherein said driving source comprises an electric motor, and wherein each of said auxiliary pressure sources comprises a fluid pump driven by said electric motor for introducing the brake fluid from said auxiliary reservoir and discharging the pressurized brake fluid from said fluid pump.

10. A hydraulic braking system as claimed in claim 9, wherein said first valve means comprises a normally open two-port two-position electromagnetic valve, and wherein said second valve means comprises a normally closed two-port two-position electromagnetic valve.

11. A hydraulic braking system as claimed in claim 1, wherein said hydraulic braking pressure circuit comprises:

a plurality of wheel cylinders operatively mounted on the wheels of said automotive vehicle, respectively;

a reservoir for storing the brake fluid; and a master cylinder for introducing the brake fluid from said reservoir and generating a master cylinder pressure in response to a depression of a brake pedal, and wherein said hydraulic braking system further comprises:

first valve means disposed between said master cylinder and at least first and second wheel cylinders of said wheel cylinders for opening or closing the communication therebetween; and second valve means disposed between said first valve means and said first and second wheel cylinders for opening or closing the communication between said first valve means and said first wheel cylinder, and the communication between said first valve means and said second wheel cylinder, respectively, and wherein said auxiliary pressure source is connected at the outlet thereof to a position between said first valve means and said second valve means, and said auxiliary valve means is disposed in said circulation passage.

12. A hydraulic braking system as claimed in claim 11, wherein said first valve means comprises a normally open two-port two-position electromagnetic valve, said second valve means comprises a pair of normally open two-port two-position electromagnetic valves disposed between said first valve means and said first wheel cylinder, and between said first valve means and said second wheel cylinder, respectively, and said auxiliary valve means comprises a normally closed two-port two-position electromagnetic valve, and wherein a first check valve and a second check valve are disposed between said master cylinder and said first and second wheel cylinders, respectively, said first and second check valves permitting the brake fluid to flow in the direction toward said master cylinder and preventing the brake fluid from flowing in the reverse direction.

13. A hydraulic braking system as claimed in claim 11, wherein the outlet side of said auxiliary pressure source is connected to said master cylinder through a check valve for permitting the brake fluid to flow in the direction toward said master cylinder and preventing the brake fluid from flowing in the reverse direction.

14. A hydraulic braking system as claimed in claim 13, wherein said auxiliary pressure source comprises an electric motor and a fluid pump driven by said electric motor for introducing the brake fluid from said auxiliary reservoir into said fluid pump through the inlet thereof and discharging the pressurized brake fluid from the outlet of said fluid pump.

15. A hydraulic braking system as claimed in claim 14, further comprising a pair of check valves disposed at the inlet side and the outlet side of said fluid pump, respectively, for limiting the flow of brake fluid in the predetermined direction for circulating the brake fluid.

16. A hydraulic braking system as claimed in claim 12, further comprising, changeover valve means disposed between said master cylinder and said first and second check valves for being selectively placed in one of a first position where said first and second check valves are communicated with said master cylinder, and where the communication between said master cylinder and the inlet side of said auxiliary pressure source is blocked, and a second position where the communication between said first and second check valves and said master cylinder is blocked, and where the inlet side of said auxiliary pressure source is communicated with said master cylinder.

17. A hydraulic braking system as claimed in claim 16, wherein said auxiliary pressure source comprises an electric motor and a fluid pump driven by said electric motor for introducing the brake fluid from said auxiliary reservoir into said fluid pump through the inlet thereof and discharging the pressurized brake fluid from the outlet of said fluid pump.

18. A hydraulic braking system as claimed in claim 17, further comprising;

a pair of check valves disposed at the inlet side and the outlet side of said fluid pump, respectively, for limiting the flow of brake fluid in the predetermined direction for circulating the brake fluid; and a check valve disposed between one of said check valves disposed at the inlet side of said fluid pump and said auxiliary reservoir, for permitting the brake fluid to flow in said predetermined direction.

19. A hydraulic braking system as claimed in claim 18, further comprising a check valve disposed between at least one of said first and second wheel cylinders and a passage connecting said changeover valve means with the outlet side of said auxiliary pressure source, said check valve permitting the brake fluid in the direction toward said wheel cylinder and preventing the brake fluid from flowing in the reverse direction.

20. A hydraulic braking system as claimed in claim 18, further comprising a relief valve disposed between said master cylinder and the outlet side of said auxiliary pressure source, said relief valve returning the brake fluid discharged from said auxiliary pressure source into said master cylinder when the discharged brake fluid exceeds a predetermined pressure.

21. A hydraulic braking system as claimed in claim 1, wherein said hydraulic braking pressure circuit comprises;
- a plurality of wheel cylinders operatively mounted on the wheels of said automotive vehicle, respectively;
- a reservoir for storing the brake fluid; and
- a master cylinder for introducing the brake fluid from said reservoir and generating a master cylinder pressure in response to a depression of a brake pedal, and wherein said hydraulic braking system further comprises:
- first valve means disposed between said master cylinder and at least first and second wheel cylinders of said wheel cylinders for opening or closing the communication therebetween; and
- third valve means disposed between the outlet of said auxiliary pressure source and said first and second wheel cylinders for opening or closing the communication between said auxiliary pressure source and said first wheel cylinder, and the communication between said auxiliary pressure source and said second wheel cylinder, respectively.

22. A hydraulic braking system as claimed in claim 21, wherein said first valve means comprises a normally open two-port two-position electromagnetic valve, said third valve means comprises a pair of normally closed two-port two-position electromagnetic valves disposed between said auxiliary pressure source and said first wheel cylinder, and between said auxiliary pressure source and said second wheel cylinder, respectively, and said auxiliary valve means comprises a normally closed two-port two-position electromagnetic valve, and wherein a first check valve and a second check valve are disposed between said master cylinder and said first and second wheel cylinders, respectively, said first and second check valves permitting the brake fluid to flow in the direction toward said master cylinder and preventing the brake fluid from flowing in the reverse direction, and wherein a third check valve and a fourth check valve are disposed between said first valve means and said first and second wheel cylinders, respectively, said third and fourth check valves permitting the brake fluid to flow in the direction toward said first and second wheel cylinders and preventing the brake fluid from flowing in the reverse direction.

23. A hydraulic braking system as claimed in claim 21, wherein the outlet side of said auxiliary pressure source is connected to said master cylinder through a check valve for permitting the brake fluid to flow in the direction toward master cylinder and preventing the brake fluid from flowing in the reverse direction.

24. A hydraulic braking system as claimed in claim 23, wherein said auxiliary pressure source comprises an electric motor and a fluid pump driven by said electric motor for introducing the brake fluid from said auxiliary reservoir into said fluid pump through the inlet thereof and discharging the pressurized brake fluid from the outlet of said fluid pump.

25. A hydraulic braking system as claimed in claim 24, further comprising a pair of check valves disposed at the inlet side and the outlet side of said fluid pump, respectively, for limiting the flow of brake fluid in the predetermined direction for circulating the brake fluid.

26. A hydraulic braking system as claimed in claim 22, further comprising, changeover valve means disposed between said master cylinder and said first and second check valves for being selectively placed in one of a first position where said first and second check valves are communicated with said master cylinder, and where the communication between said master cylinder and the inlet side of said auxiliary pressure source is blocked, and a second position where the communication between said first and second check valves and said master cylinder is blocked, and where the inlet side of said auxiliary pressure source is communicated with said master cylinder.

27. A hydraulic braking system as claimed in claim 26, wherein said auxiliary pressure source comprises an electric motor and a fluid pump driven by said electric motor for introducing the brake fluid from said auxiliary reservoir into said fluid pump through the inlet thereof and discharging the pressurized brake fluid from the outlet of said fluid pump.

28. A hydraulic braking system as claimed in claim 27, further comprising;
- a pair of check valves disposed at the inlet side and the outlet side of said fluid pump, respectively, for limiting the flow of brake fluid in the predetermined direction for circulating the brake fluid; and
- a check valve disposed between one of said check valves disposed at the inlet side of said fluid pump and said auxiliary reservoir, for permitting the brake fluid to flow in said predetermined direction.

29. A hydraulic braking system as claimed in claim 28, further comprising a check valve disposed between at least one of said first and second wheel cylinders and a passage connecting said changeover valve means with the outlet side of said auxiliary pressure source, said check valve permitting the brake fluid in the direction toward said wheel cylinder and preventing the brake fluid from flowing in the reverse direction.

30. A hydraulic braking system as claimed in claim 28, further comprising a relief valve disposed between said master cylinder and the outlet side of said auxiliary pressure source, said relief valve returning the brake fluid discharged from said auxiliary pressure source into said master cylinder when the discharged brake fluid exceeds a predetermined pressure.

* * * * *